US009787546B2

(12) United States Patent
Bardgett et al.

(10) Patent No.: US 9,787,546 B2
(45) Date of Patent: Oct. 10, 2017

(54) NETWORK MANAGEMENT SYSTEM GENERATING VIRTUAL NETWORK MAP AND RELATED METHODS

(71) Applicant: HARRIS CORPORATION, Melbourne, FL (US)

(72) Inventors: James A. Bardgett, Oviedo, FL (US); Marcus Alexander Miguez, Melbourne, FL (US); Paul Wierzbowski, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 564 days.

(21) Appl. No.: 13/961,132

(22) Filed: Aug. 7, 2013

(65) Prior Publication Data

US 2015/0043378 A1    Feb. 12, 2015

(51) Int. Cl.
*H04L 12/24* (2006.01)
*H04L 12/46* (2006.01)

(52) U.S. Cl.
CPC .......... *H04L 41/12* (2013.01); *H04L 12/4641* (2013.01)

(58) Field of Classification Search
None
See application file for complete search history.

(56) References Cited

U.S. PATENT DOCUMENTS

| 6,816,897 | B2 | 11/2004 | McGuire |
| 7,984,143 | B2 | 7/2011 | Sullivan |
| 8,045,486 | B2 | 10/2011 | Swan |
| 8,195,797 | B2 | 6/2012 | Sullivan |
| 8,274,912 | B2 | 9/2012 | Wray et al. |
| 8,352,620 | B2 | 1/2013 | Conrad |
| 8,407,366 | B2 | 3/2013 | Alkhatib et al. |
| 2003/0009552 | A1 | 1/2003 | Benfield et al. |
| 2005/0108379 | A1* | 5/2005 | Gray ................... H04L 12/4641 709/223 |
| 2005/0234682 | A1 | 10/2005 | Graves et al. |

(Continued)

OTHER PUBLICATIONS

Houidi et al., "A Distributed and Autonomic Virtual Network Mapping Framework," GET-INT Technical Report, Nov. 2007, pp. 1-24.

(Continued)

*Primary Examiner* — Hassan Phillips
*Assistant Examiner* — Gautam Sharma
(74) *Attorney, Agent, or Firm* — Allen, Dyer, Doppelt & Gilchrist, P.A. Attoneys at Law

(57) ABSTRACT

A network management system is for a network having network devices. The network management system includes a display, a memory, and a processor coupled to the display and memory and configured to send queries to the network devices, obtain responses from the network devices based upon the queries, and determine a physical network map for the network devices based upon the responses. The processor is also configured to establish connections with some of the network devices, determine a virtual network map for the network devices based upon the responses and the established connections, store mapping data related to the determined physical network map and virtual network map in the memory, and display an image on the display related to the stored mapping data.

23 Claims, 24 Drawing Sheets

(56) References Cited

U.S. PATENT DOCUMENTS

| | | |
|---|---|---|
| 2006/0200253 A1* | 9/2006 | Hoffberg .............. G05B 15/02 |
| | | 700/19 |
| 2008/0225875 A1 | 9/2008 | Wray et al. |
| 2008/0301303 A1 | 12/2008 | Matsuoka |
| 2009/0180393 A1* | 7/2009 | Nakamura .............. H04L 41/12 |
| | | 370/252 |
| 2011/0119390 A1 | 5/2011 | Leech et al. |
| 2011/0283017 A1 | 11/2011 | Alkhatib et al. |
| 2011/0320821 A1 | 12/2011 | Alkhatib et al. |
| 2012/0030363 A1 | 2/2012 | Conrad |
| 2013/0058346 A1 | 3/2013 | Sridharan et al. |
| 2014/0195666 A1* | 7/2014 | Dumitriu ............ H04L 12/4625 |
| | | 709/223 |
| 2014/0269403 A1* | 9/2014 | Anghel .............. H04L 43/0817 |
| | | 370/253 |

OTHER PUBLICATIONS

Lischka et al., "A Virtual Network Mapping Algorithm Based on Subgraph Isomorphism Detection," Paderborn Center for Parallel Computing, Paderborn University, Paderborn, Germany, Aug. 17, 2009, pp. 81-88.

Marquezan et al., "Distributed Reallocation Scheme for Virtual Network Resources," IEEE ICC 2009 Proceedings, 2009, 5 pages.

Wang et al., "Network Virtualization: Technologies, Perspectives, and Frontiers," Journal of Lightwave Technology, vol. 31, No. 4, Feb. 15, 2013, pp. 523-537.

* cited by examiner

NETWORK MANAGEMENT SYSTEM GENERATING VIRTUAL NETWORK MAP AND RELATED METHODS

FIELD OF THE INVENTION

The present invention relates to the field of computer networking, and, more particularly, to devices for mapping networks and related methods.

BACKGROUND OF THE INVENTION

Since the 1970's and the creation of ARPANET, the first modern network and predecessor of the Internet, computer interconnectivity or networking has been a typical functionality for host computing devices. With the genesis of the Internet came a clear understanding of the networking of host compute devices, network switch/hubs and network router/gateways. Early network routing devices (originally termed gateways or hubs) utilized single non-virtualized instances of Gateway-to-Gateway Protocol and Exterior Gateway Protocol created by Bold, Beranek and Newman (BBN). The first known logical map of an IP network was for ARPANET, created in March 1977. The ARPANET map shows the physical network of host computers and network devices which utilized early routing protocols to route packets.

Modern networks can include thousands of computing devices in local or geographically remote locations and a large number of subnetworks and thus require more complex arrangements. Many applications include firewalls and various forms of virtualization in their networks that can impede network traffic and network discovery.

As with any complex network, device failure can cause reduction of performance, key services, and critical redundancy. For example, if a network switch fails, numerous computing devices may be left unconnected to the network or left with reduced bandwidth. Typically, the solution is simple involving hardware replacement; however, it is more complex to identify the root cause of the failure. For example, a common scenario is that a portion of a large network experiences a lack of functionality such as reachability, and the originating cause can be any number of problems, thereby causing the information technology (IT) personnel to have to sequentially attempt methods to diagnose the problem, an effective but lengthy process.

A solution to this issue is network management software which can monitor key components of the network and provide status indicators to appropriate IT personnel. Network switches and routers possess physical ports which permit them to behave as hosts on the network. Just as one host may contact another, a network management program running on a host can contact a switch or a router for management purposes. This includes configuration changes and queries of the state, interconnectivity, and performance of the switch, router or other network device. Protocols like Simple Network Management Protocol (SNMP) permit the query of network devices for physical characteristics like the state of a port on a network switch and for some logical characteristics like the status of a single routing protocol on a router. This is done by querying an Object Identifier (OID) for an object in a Management Information Base (MIB), which is a data structure contained in the network device. Other query approaches are possible such as manual observation of output from commands entered on a command-line interface (CLI) or automation of said manual process. Network management software is currently typically dependent upon being able to reach the management addresses of devices to collect physical connectivity information between network devices as well as hosts. This approach generally works within the control plane of the network device and thus provides primarily a single physical view of the network. At present, this method cannot produce a logical hierarchy of distinct logical views with or without overlapping IP address space.

Another approach utilizes network mapping software. Network mapping software is executed on a computing device coupled to the subject network and attempts to determine the network structure by sending inquiries throughout the network. This process works for networks which are logically contiguous, in which rules permit the communication to all locations and which no logical discontinuities exist. This approach generally works within the data plane or data paths of the network device and thus provides primarily a logical view of the network. However, it cannot create multiple logical levels or one where IP addressing space is overlapping between multiple logical levels.

Network device virtualization was created in part to more fully utilize network hardware and reduce the number of devices needed to support diverse modern networks. Network switch virtualization segments switches into logical partitions known as Virtual Local Area Networks (VLANs). Each logical partition allows the communication of devices with the proper IP address and subnet to communicate with devices on the same VLAN. Separate VLANs allow a limited number of hosts to communicate across an isolated set of ports assigned to the VLAN in which they are connected. The only method of communication between devices on different VLANs is through a connection to a router. Thus, host devices on the same given VLAN can communicate with each other, but cannot communicate with host devices in a different VLAN without an interconnecting router.

Network link virtualization has been common for over a decade with the creation of IEEE 802.1q, a protocol permitting the combining (trunking) of multiple VLANs over a single physical connection. For example, in a typical network, a network switch using IEEE 802.1q can instantiate multiple VLANs on a single connection and different connections can use any combination of VLANs. Combining network switch virtualization and network link virtualization without routing even without the use of firewalls will create separated switched domains and isolated switch paths in a network. Network mapping software could resolve this by connecting to separate interfaces, but this has several problems concerning scale and connecting to all VLANs. Drawing a network with VLANs from inquiries only within the data plane is also difficult. Devices communicating on a single VLAN can be supported with different physical configurations. A virtualized link connection may occur between a switch and a host compute device, two switches, or a switch and a router. When multiple VLANs pass between a network switch and a host compute device, this allows the host to participate in several different networks along possibly isolated network paths created by link, switch, and router virtualization. Current network management and network mapping software have difficulty in displaying such diverse discontinuous network logic possibilities that VLANs can support, particularly when router virtualization is involved.

Network router virtualization may contain multiple routing instances or Virtual Route Forwarding (VRF) Instances for creating separate routing domains within a physical router. In combination with link and switch virtualization, a virtual infrastructure may be constructed with unique paths which can be isolated or combined depending on configuration and creativity. A network router with virtual routing has tables for each virtual routing instance which contain records. The router table records relate items such as network scope, next hop and logical or physical path out of the device to the next hop destination depending on routing protocol utilized. Network scope may be the network and subnet, next hop may be the final destination or another router, and the path out of the device may be logical which is related to a specific physical path. A single network router may have virtual routers with overlapping IP address space that may indicate the same devices or may not which creates difficulty for existing network management systems. Virtual routers and the mapping of physical and logical interfaces segment devices in ways that prohibit existing network management systems and network mapping systems from accurately providing correct logical maps. For example, network mapping software working within a data plane is not aware of the virtual networking configuration, thus the network displayed may include breaks and improper visibility of host computers or network devices. The correct mapping and visualization of a virtualized network infrastructure requires another method in order for IT staff to properly visualize the layers of virtualization and understand the network complexities.

Another approach is disclosed in U.S. Pat. No. 8,274,912 to Wray et al. This approach discloses a method for mapping and discovery of a virtual network. The method uses user packets and mines the user packets for information, such as the destination and source addresses. Nevertheless, this method may not visualize a multiple virtual domain network or show multiple logical connections with a single physical entity as the technology relates to host computer virtualization and not network device virtualization. It cannot resolve multiple overlapping IP address space concerns and create a correct view of a network which works at multiple independent logical isolated paths.

SUMMARY OF THE INVENTION

In view of the foregoing background, it is therefore an object of the present invention to provide a network management system that may accurately depict virtual and physical networks in a detailed and dynamic fashion.

This and other objects, features, and advantages in accordance with the present invention are provided by a network management system for a network comprising a plurality of network devices. The network management system comprises a display, a memory, and a processor coupled to the display and memory. The processor is configured to send queries to the plurality of network devices, obtain responses from the plurality of network devices based upon the queries, determine a physical network map for the plurality of network devices based upon the responses, and establish connections with at least some of the plurality of network devices. The processor is configured to determine a virtual network map for the plurality of network devices based upon the responses and the established connections, store mapping data related to the determined physical network map and virtual network map in the memory, and display an image on the display related to the stored mapping data. Advantageously, the generated mapping data is more accurate.

In some embodiments, the processor may be configured to determine for each network device a device type from a plurality of different device types based upon the responses, and establish the connections with at least some of the plurality of network devices based upon determined device types. The processor also may be configured to determine the virtual network map for the plurality of network devices by at least determining, for each respective network device, at least one virtual routing instance and an associated port, and at least one neighboring device and associated routes.

More specifically, the processor also may be configured to sample communications data, via the established connections, from at least some of the plurality of network devices, and perform correlation processing on the sampled communications data to determine the virtual network map. For example, the processor may be configured to perform the correlation processing based upon a network routing protocol. Additionally, the processor may be configured to detect at least one network event in the network, and determine potential changes to the mapping data resulting from at least one network event.

Another aspect is directed to a method of operating a network management system for a network comprising a plurality of network devices. The method includes using a memory and processor coupled therewith to send queries to the plurality of network devices, obtain responses from the plurality of network devices based upon the queries, determine a physical network map for the plurality of network devices based upon the responses, and establish connections with at least some of the plurality of network devices. The method further includes using the memory and processor coupled therewith to determine a virtual network map for the plurality of network devices based upon the responses and the established connections, store mapping data related to the determined physical network map and virtual network map in the memory, and display an image on a display related to the stored mapping data.

Yet another aspect is directed to a non-transitory computer readable medium storing executable instructions that, when executed, cause a processor to perform steps for operating a network management system for a network comprising a plurality of network devices. The steps comprise sending queries to the plurality of network devices, obtaining responses from the plurality of network devices based upon the queries, determining a physical network map for the plurality of network devices based upon the responses, and establishing connections with at least some of the plurality of network devices. The steps also include determining a virtual network map for the plurality of network devices based upon the responses and the established connections, storing mapping data related to the determined physical network map and virtual network map in the memory, and displaying an image on a display related to the stored mapping data.

BRIEF DESCRIPTION OF THE DRAWINGS

FIG. 11 is a schematic diagram of different versions of a network and both physical and logical details for both devices (i.e. router and switch) and links pertaining to a single "mgmt routing instance" or "mgmt VRF" from the network management system of FIG. 3.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The invention provides an interface to permit an informed user to define the physical and logical extent and features of a network including a level of confidence about the information supplied. Also provided is an exhaustive query of physical and logical components of network devices on a network of defined scope using the input from the user interface and applying a logical model to ascertain the scope of the network. The physical and logical component queries include all aspects of the physical and logical network, including physical ports, logical ports, virtualized ports, vlans, vlan logical layer 3 interfaces, logical interfaces, virtualized hosts, virtualized switches, virtualized routers, virtualized links, VRFs, routing instances, virtualized routing instances, routing protocols, routing sub-processes, routes and device-maintained relationships such as routes and ports, and interfaces belonging to a virtualized router. A method of reconciling the two methods is provided by use of a logic-based correlation engine which also encompasses an interactive user interface to allow influence of the reconciliation method. A method for building tuples, maps and databases which store the above mentioned aspects of the physical and logical network is included in the invention. The logic-based correlation engine reconciles the many possible physical and logical views representing detailed features of each device including intricate logical connectivity, internal physical structure and logical structure. A method is provided to display the output of the correlation engine in a way that provides users many physical and logical views which can be overlaid, individual or multiple views on a single screen which shows internal physical and logical aspects mentioned above. Methods used by the invention include various queries, logical packet tests and scanning.

Other aspects of the invention include corresponding computer networks, methods of sending packets over such networks, and corresponding computer programs. Additional features can be combined together, and combined with any of the aspects, as would be apparent to those skilled in the art. The embodiments are examples only, the scope is not limited by these examples, and many other examples can be conceived within the scope of the claims.

Figure 1:
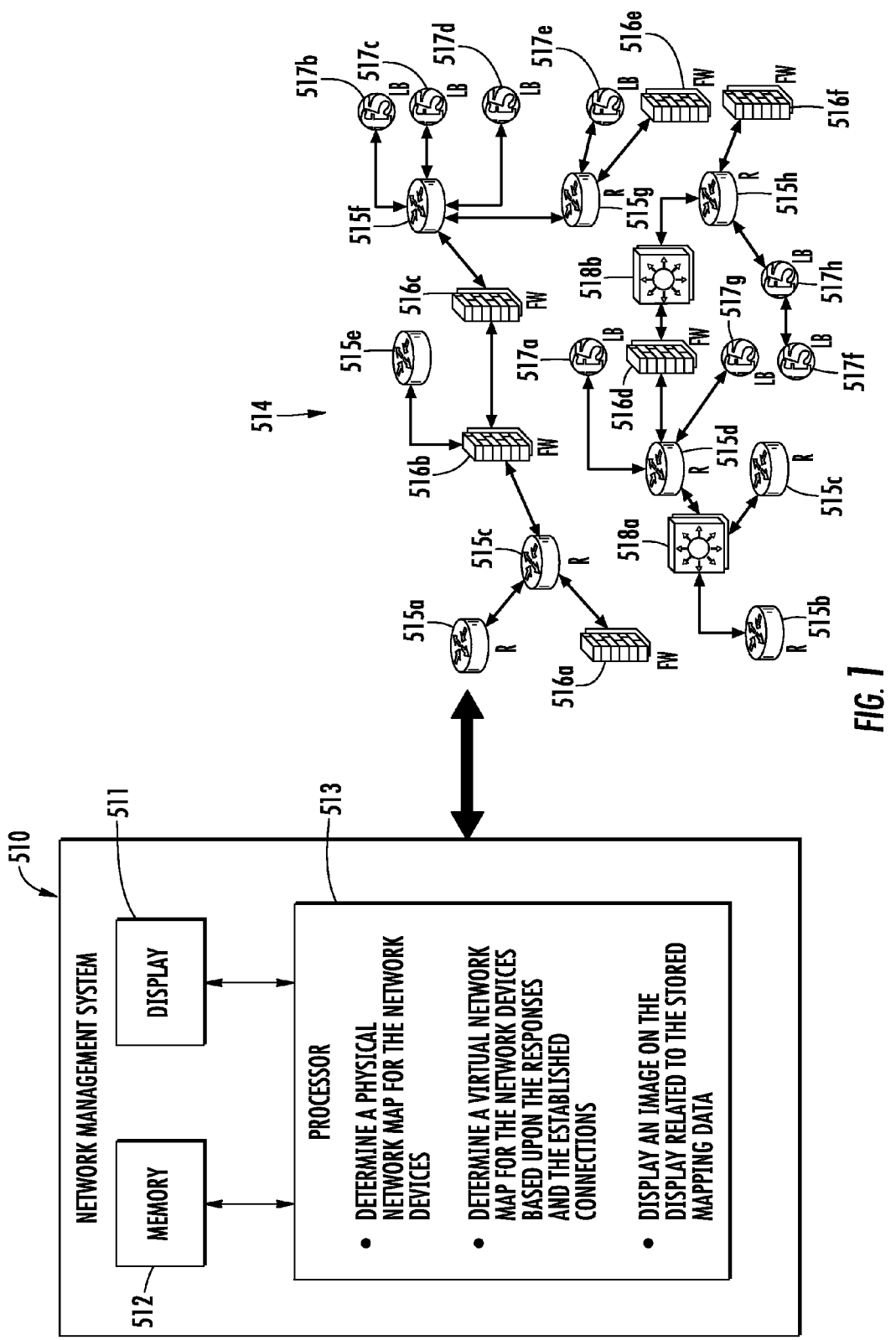
FIG. 1 is a schematic diagram of a network management system, according to the present invention, coupled to an unknown network.
Figure 2:
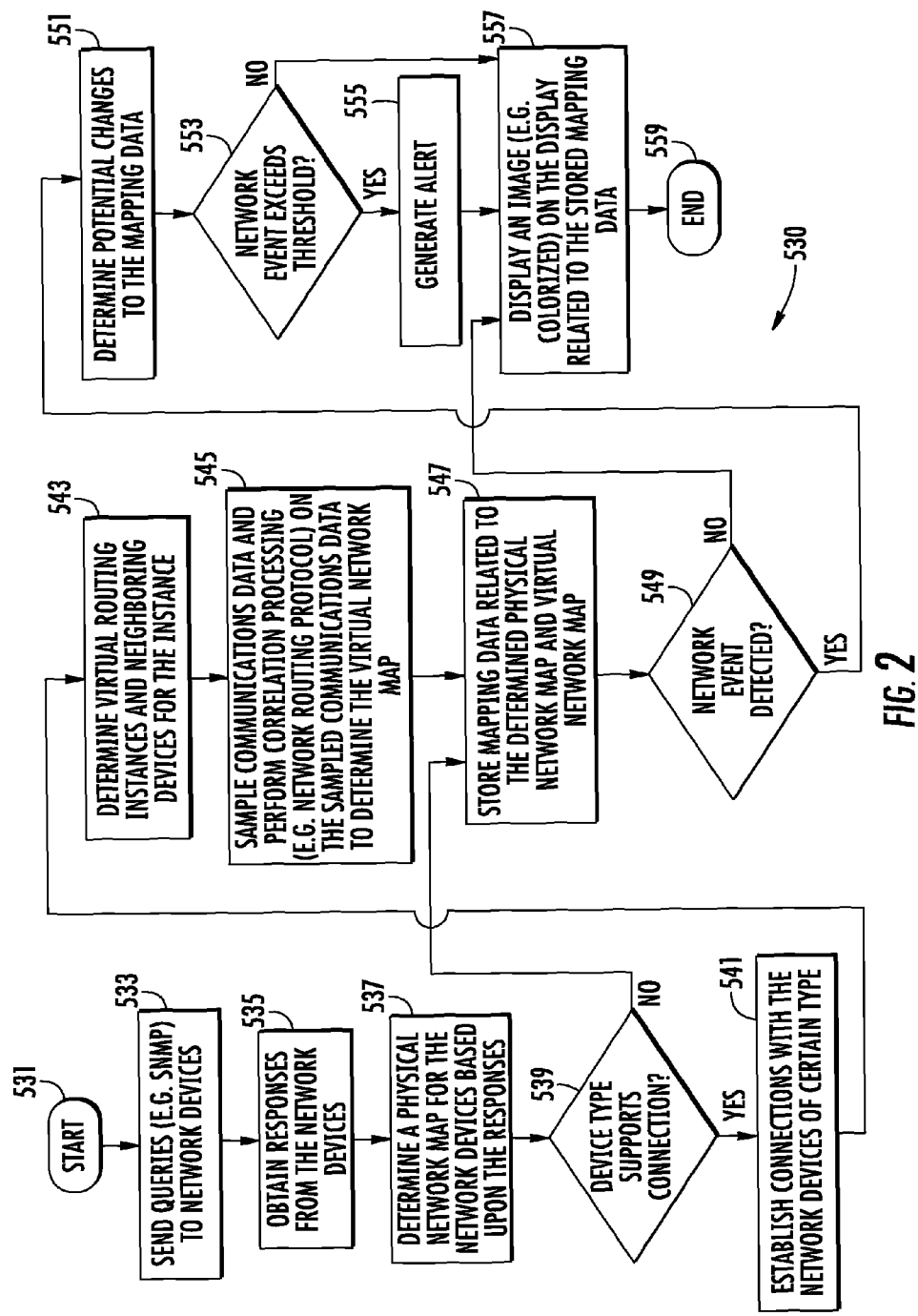
FIG. 2 is a flowchart for operating the network management system of FIG. 1.
Figure 4:
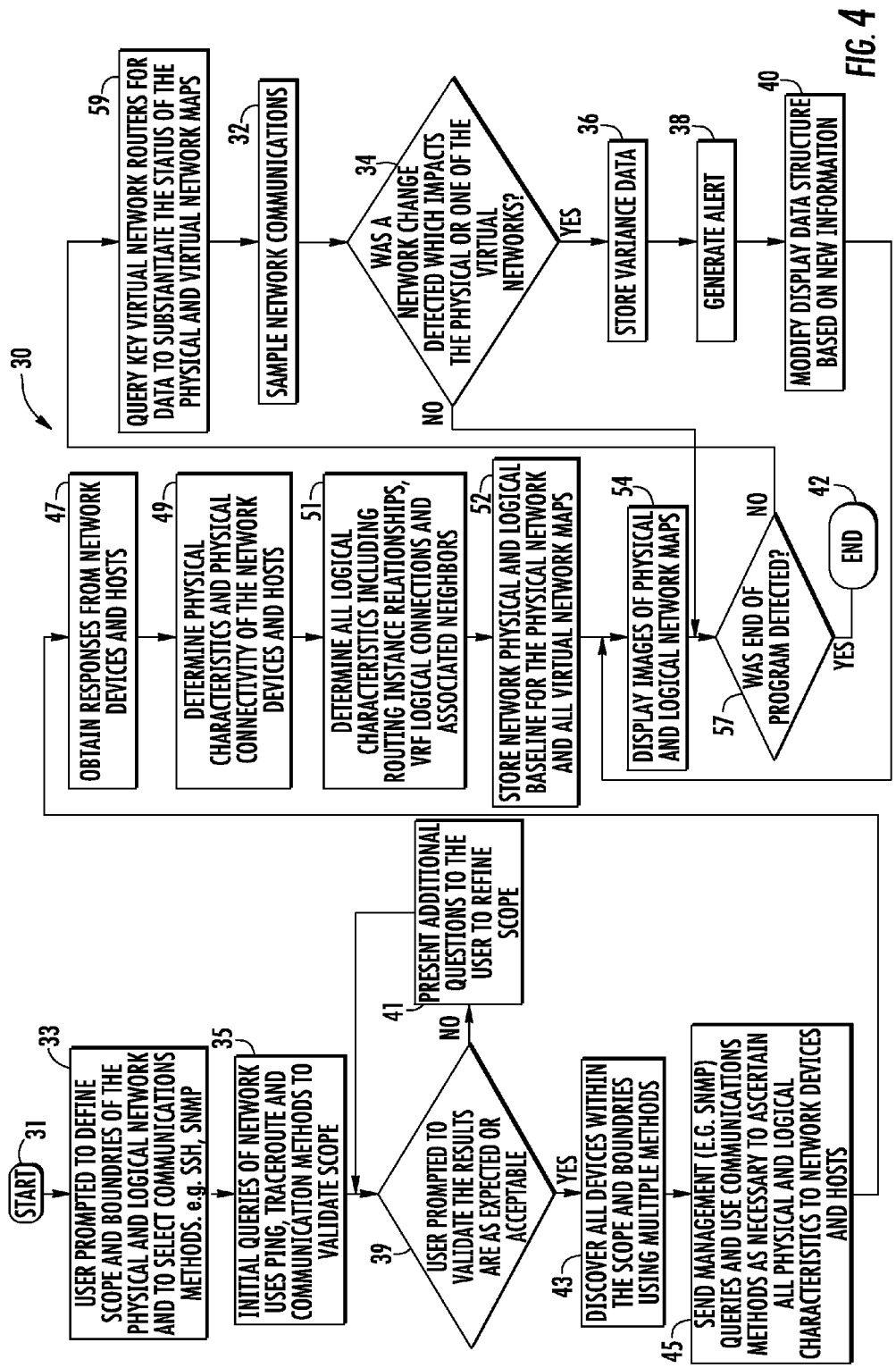
FIG. 4 is a flowchart for operating the network management system of FIG. 3.

Referring now to FIGS. 1-2 and 4, a network management system 10 according to the present invention is now described. Also, with reference to flowcharts 30 & 530, a method for operating the network management system 10 is also described, starting at Blocks 31 & 531. The network management system 10 is coupled to a network 14 comprising a plurality of network devices 15a-18c and host computer devices 19a-c. In particular, the network 14 illustratively includes a plurality of routers 15a-15i, a plurality of firewall devices 16a-16f, a plurality of switch devices 18a-18c, a plurality of load balancers 17a-17h and host compute devices 19a-19c, which represent servers and workstations.

The plurality of network devices 15a-18c comprises a plurality of physical network devices and a plurality of virtual network devices. For example, each router 15a-15i may comprise a plurality of virtual routers, virtual routing instances and routing protocols. Indeed, the network 14 may comprise a plurality of virtual networks which may be related to the virtual routers that include overlapping IP addresses. Also, one virtual network may be private to other virtual networks being associated with a virtual router and function as an isolated path, i.e. the other networks cannot see the one private virtual network due to configuration of the Virtual Routing and Forwarding (VRF) or other logical routing construct.

The network management system 10 includes a network interface 8, user input device 9, display 11, a memory 12, and a processor 13 coupled to the display and memory and user input device. For example, the network management system 10 may comprise a general purpose computing device modified in accordance with the teachings herein.

The processor 13 is configured to interact with the user to collect information used in determining the physical and logical extent of the network 14 as shown in the prompts (Blocks 33, 35, 39 and 41). The processor 13 is configured to send queries such as JMS, XML, Netconf or SNMP using the network interface or interfaces 8 to the plurality of network devices 15a-18c and compute hosts 19a-19c (Blocks 43, 45, & 533). The processor 13 is configured to send the queries as SNMP messages, for example. In SNMP message embodiments, the SNMP messages may be directed to layer 3 devices, such as firewall devices 16a-16f, gateways, and layer 3 switches or layer 2 devices with out-of-band Layer 3 management ports. The queries request a response with certain information from the respective network devices 15a-18c and compute hosts 19a-19c. For example, the information may comprise a device type, status information and available logical information depending on the device MIB, OID, Operating System, Manufacturer and correctness.

In some embodiments, the processor 13 may be capable of querying the plurality of network devices 15a-18c via one or more methods to determine the logical characteristics (i.e. virtual) topology or multiple logical topologies based on network virtualization. For example, the methods may include command line applications, such as Telnet protocol applications, and issuing commands (e.g. on Cisco "Show ip ospf neighbor vrf all"), and then parsing the output using network engineering knowledge of the command set and authoring logic in the processor 13, which automates the process.

The processor 13 is configured to obtain responses from the plurality of network devices based upon the queries (Blocks 47 & 535). The processor 13 is illustratively configured to determine for each network device 15a-18c a detailed device type from a plurality of different device types based upon the responses (Block 49). If the processor 13 determines that some of the network devices 15a-18c and compute hosts 19a-19c are devices which may possess virtualization characteristics and as is common supporting connections, the processor establishes connections with some of the plurality of network devices based upon determined device types to determine all logical characteristics (Blocks 45, 51, 539, & 541). In some embodiments, the processor 13 may establish connections with routers 15a-15i only. In some embodiments, the connections may comprise secure shell (SSH) connections.

The processor 13 is configured to determine a physical network map for the plurality of network devices 15a-18c based upon the responses (Block 47 & 537). For example, the processor 13 may determine the physical network map to comprise the plurality of physical network devices (such as host compute devices 19a-19c, switch devices 18a-18c, routers 15a-15i, firewall devices 16a-16f, gateways, proxies, load balancers 17a-17h) and the physical connections in between.

Once the aforementioned establishment of the connections with the plurality of network devices 15a-18c and the sampling operation, the processor 13 is configured to determine a virtual network map for the plurality of network devices 15a-18c based upon the responses and the established connections, in particular, the correlation processing of the sampled data (Blocks 49 and 51). The processor 13 is configured to collect names and device index numbers, clarify relationships using configuration information and knowledge base created by device knowledge, create a table, and create table index numbers and assign per row. Of course, the network 14 may comprise a plurality of virtual networks, and the processor 13 may determine respective virtual network maps for each of the virtual networks.

The processor 13 also may be configured to determine the virtual network map for the plurality of network devices 15a-18c by at least determining, for each respective network device, at least one virtual routing instance and an associated port, and at least one neighboring device and associated routes. In other words, the processor 13 is configured to determine virtual routing instances, each port associated with a given virtual routing instance, and each neighbor or other protocol specific significant detail is recorded in a database (or in some embodiments, even text file is sufficient) (Block 543). The processor 13 may be configured to determine other devices that can been seen or understood to be present by the routing protocol.

The processor 13 is also configured to store mapping data related to the determined physical network map and virtual network map in the memory 12 (Blocks 52 & 547). For example, the processor 13 may store the data in a database or a simple text file. In particular, the data may comprise for each virtual network map, member devices, available routes, and routing protocol for the virtual network.

Additionally, the processor 13 is configured to detect a network event in the network 14, and determine potential changes to the mapping data resulting from the network event (Blocks 49, 51, 549, & 551). For example, the network event may comprise a device failure, a power failure, etc. The processor 13 is configured to determine whether the potential changes exceed a threshold level, and if so, generate an alert message (Blocks 59, 32, 34, 36, 38, 40, 553, & 555). Also, in some embodiments, the processor 13 may be configured to provide coloration to the image on the display 11 to indicate a level of the potential changes. The processor 13 also detects whether the program has been given a signal to end and ends the program appropriately. (Blocks 57, 42, & 559).

An important feature of the described invention is that it can represent complex virtual networks in various formats for indicating relationships which are difficult to understand without such representation. The processor 13 is denoted as querying an extensive number of relationships between all physical devices connected to the network including compute hosts and network devices.

Figure 5:
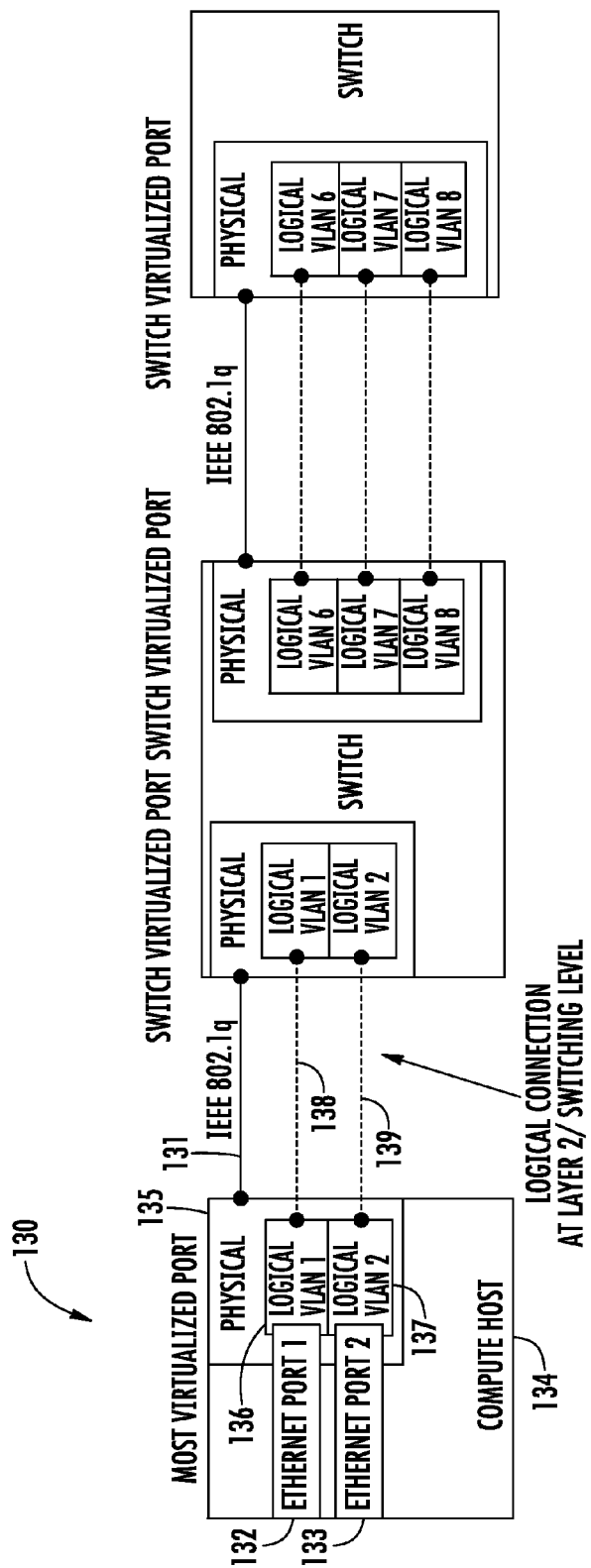
FIG. 5 is a schematic diagram of different versions of a network and both physical and logical details for both devices (i.e. host and switch) and links from the network management system of FIG. 3.

In part, the network device virtualization features shown in FIG. 5 demonstrates a view available to the user of the invention which clearly shows the detail and complexities which are revealed through various queries described above of both compute hosts 19a-19c and network devices 15a-18c. The virtualization of host interfaces creates multiple logical relationships 136-137 to the single physical interface 135 thereby enabling the host compute device 130 to connect to multiple logical links 138-139 created by link virtualization known as VLANs, shown over a physical link 131 which is configured with a logical trunking feature IEEE 802.1q. This port virtualization structure 132, 133, 135, 136 and 137 is shown in 130 on the display 11. This link virtualization structure 131, 138 and 139 is shown in 130 on the display 11. This combination of link and port virtualization 131, 138, 139, 136, 137 and 135 is shown in 130 on the display 11. This combination of compute host physical attributes and virtualization 134, 135, 136, 137, 132 and 133 is shown in 130 on the display 11.

Figure 6:
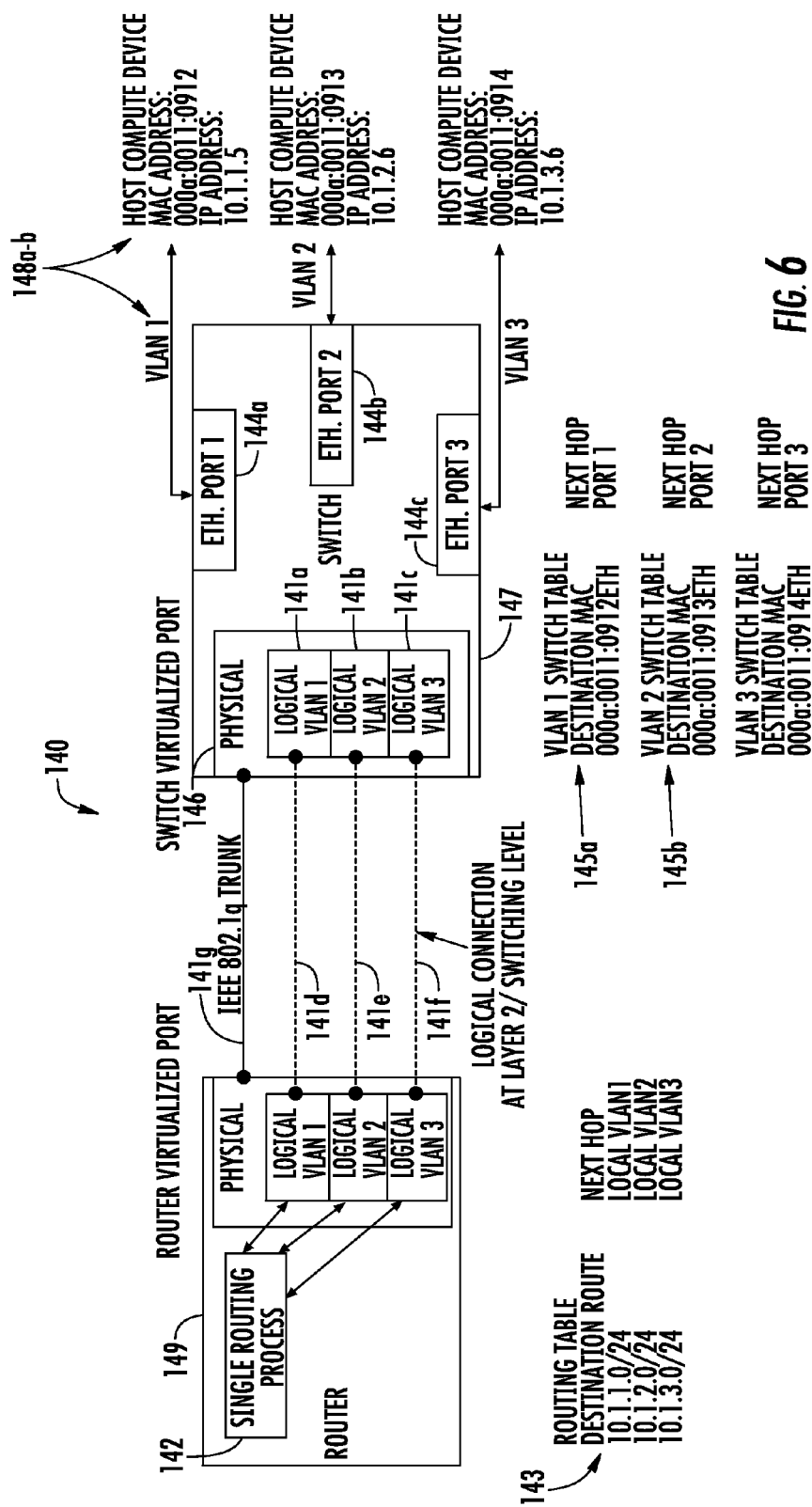
FIG. 6 is a schematic diagram of different versions of a network and both physical and logical details for both devices (i.e. router and switch) and links from the network management system of FIG. 3.

The switch shown in FIG. 6 also has link virtualization 141a-141g and possesses separate tables 145a-145b for logical connections over a physical interface 147 using IEEE 802.1q trunking protocol. The switch virtualization creates separate tables 145a-145b in the switch for media access control address (MAC address) associations based on VLANs 148a-148b. This switch port virtualization 141a-141c is shown in 140 on the display 11. These related physical attributes of physical virtualized trunk port 146, switch 147, non-virtualized switch port 144a-144c and virtual logical ports 141a-141c is shown in 140 on display 11. This virtualization of the switch creates isolation for hosts which communicate with other devices. The router 149 is not virtualized and possesses only a single routing process 142. Thus the router has only a single routing table 143 and while it possesses port and link virtualization, the router 149 is thus not virtualized.

Figure 7:
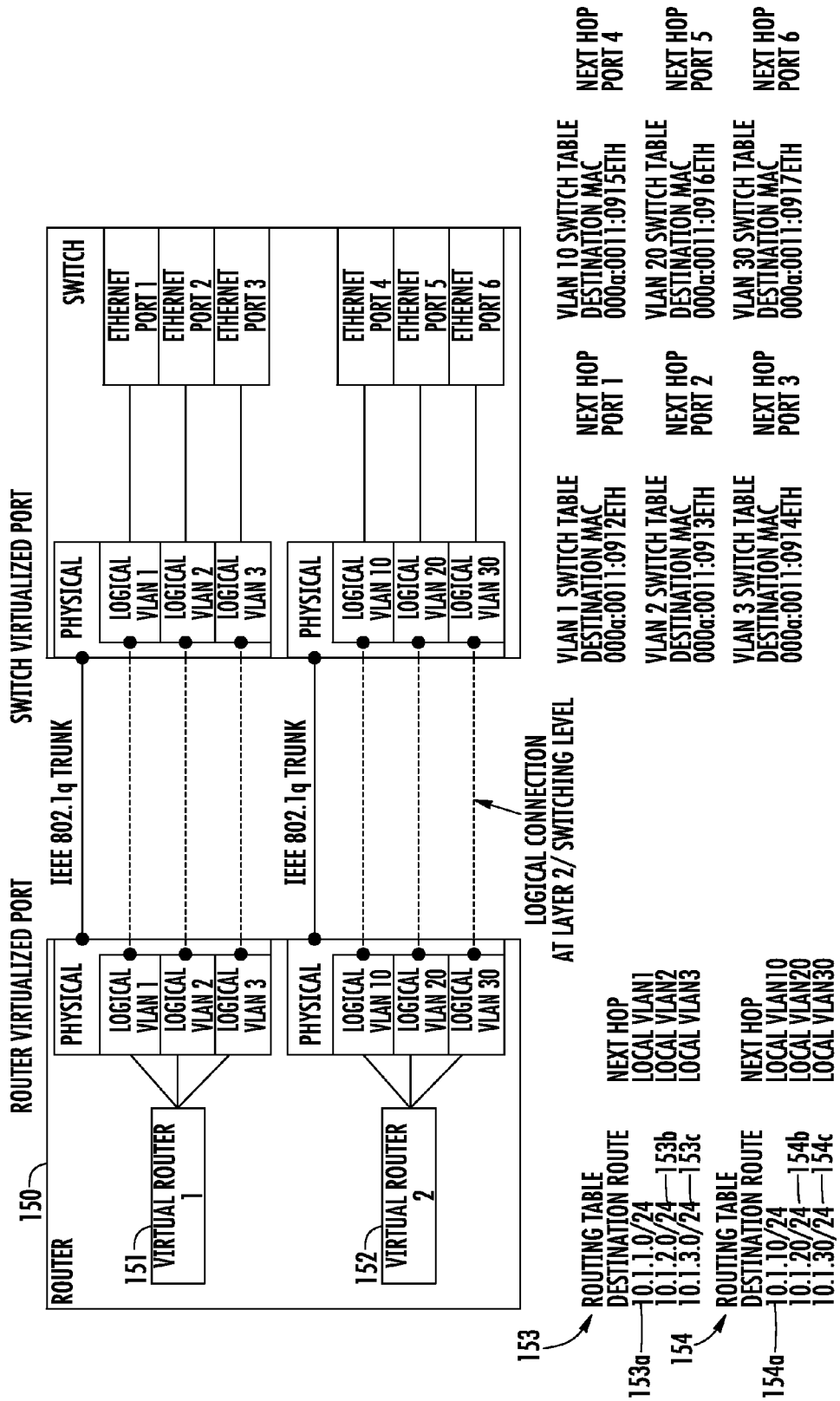
FIG. 7 is a schematic diagram of different versions of a network and both physical and logical details for both devices (i.e. router and switch) and links from the network management system of FIG. 3.
Figure 8:
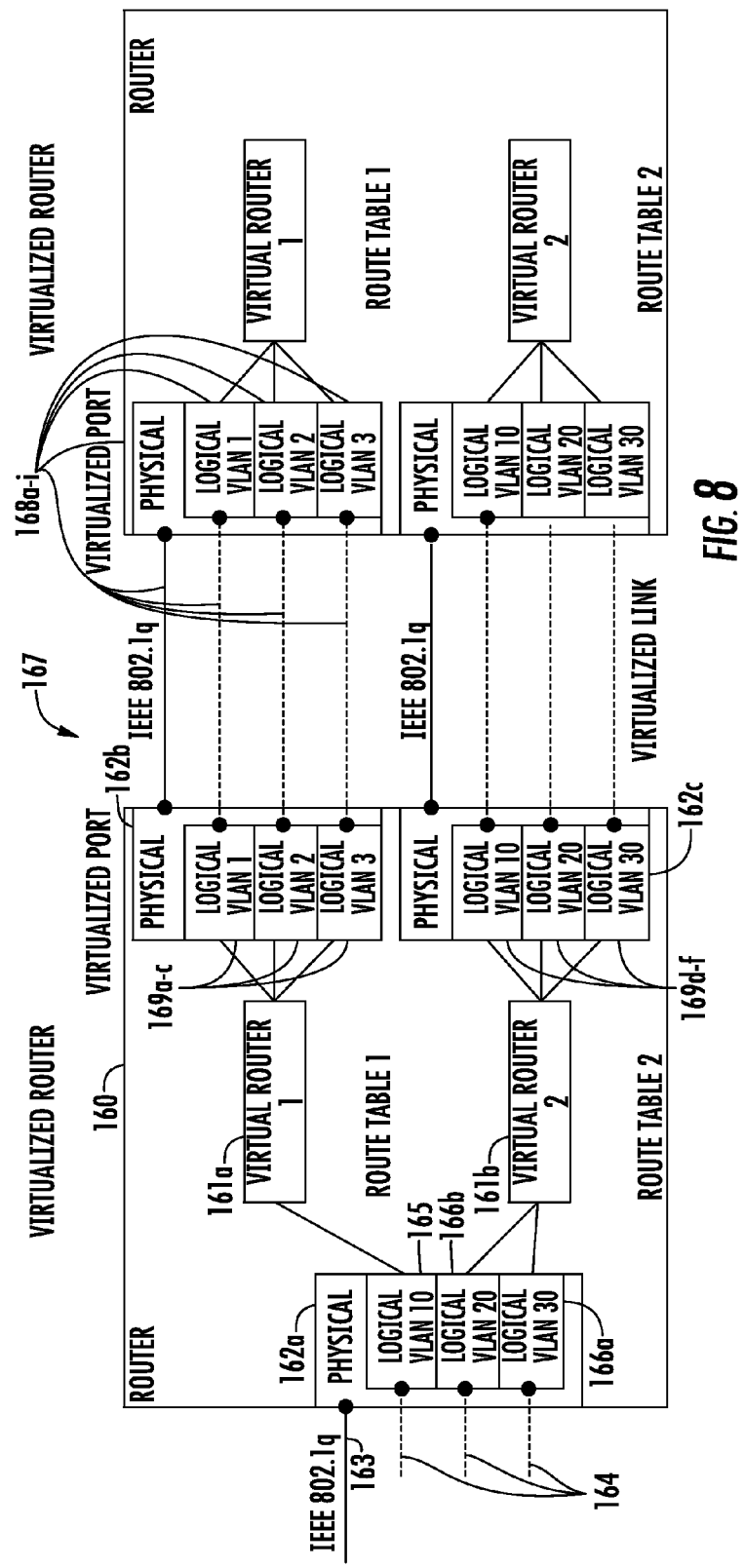
FIG. 8 is a schematic diagram of different versions of a network and both physical and logical details for routers and links from the network management system of FIG. 3.

The router 150 shown in FIG. 7 is virtualized, as it has multiple routing processes 151-152 and related routing tables 153-154, for example, routes 153a-153b are in routing table 153, shown as route table 1 associated with 151, shown as the virtual routing instance 1. The routing tables have no redistribution between them as shown and thus in this device the paths are isolated, one routing instance is unaware or not communicating in any way with the other and operating independently. FIG. 8 shows link virtualization being shared by the two unaware virtual routers 161a-161b running on the same physical router 160. The physical router thus creates a framework for router virtualization, some features completely isolated but able to be uniquely mixed together with other forms of virtualization. This ability leads to many complex inter-relationships which are conceptually difficult to envision and understand without visual representation.

In FIGS. 5-21, the user will view each of these for unique insights and understanding of their physical and virtual network features. The invention displays in a multitude of ways the relationships of virtualization. FIGS. 5-8 demonstrate some of the detailed virtualization that is unique to hosts, switches and routers which is displayed for the user as shown to help visualize the port 135-137, interface 141a-141b, link 138-139, 141c-141d and device 149-150 details of virtualization 142,151-152 and the connections formed by interconnectivity 138.

The invention follows the process shown in FIG. 4 to query devices attached to the network using multiple well known techniques, enhanced by queries regarding virtualization and virtualization relationships using network management protocols (e.g. SNMP) as well as remote terminal capture. The Network Management System uses various means of determining 51 the logical extent of virtual paths, virtual routing 151-154c and the relationships of routes to virtual routers E.g. 153a-153c relate to 153 and 151, 154a-154c relate to 154 and 152 as determined by the data collected. Virtualization may be configured properly or as intended, and alternatively it may be misconfigured for which the invention will help display. For example, it may be intended that the routing instances 151-152 share link virtualization 163-164 by using separate VLANs such as "VLAN 1" 165 and "VLAN 30" 166 on the same link 163, or it may not.

Referring briefly to FIG. 8, this view 167 is presented to the user to make the information available in one display permitting easy comprehension of the device configuration and virtualization in effect. The combination of link virtualization 163-164 and router port virtualization 165, 166a-166b at a switching level capable of showing diverse and perhaps isolated routing 161a-161b paths across a common physical port 162a and link 163 is shown in 167 on the display 11. The combination of showing virtual routers relating to isolated 169a-169f or combined 165, 166a-b virtual interfaces and physical ports 162a-162c is shown in 167 on the display 11. The physical and logical structure 168a-i is shown in 167 on the display 11.

Figure 9:
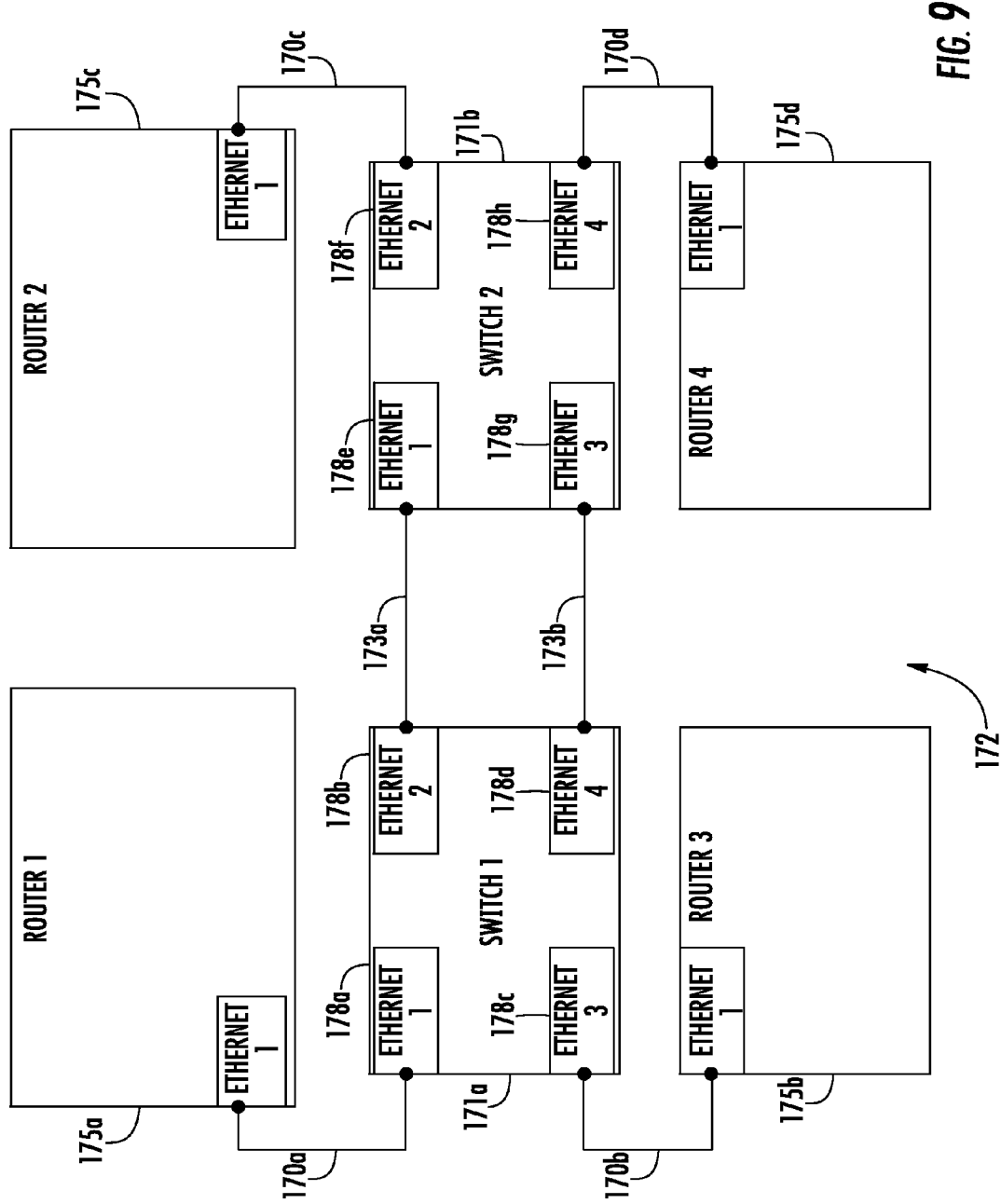
FIG. 9 is a schematic diagram of different versions of a network and the physical details for both devices (i.e. routers and switches) and links from the network management system of FIG. 3.

The physical connectivity of six (6) network devices is shown in FIG. 9, which may contain all physical details, including port speed, bandwidth, connector type, number of connections, link type such as fiber or copper and device type such as switches and routers. Two switches 171a-171b are interconnected over two cables 173a-173b which are IEEE 802.1Q trunks and may use one of many open or proprietary layer 2 or layer 3 protocols which permit full usage of all links such as Etherchannel, Virtual Port Channel, Trill or Qfabric. The switch port 178a-178h number displayed may be native to each device or logically assigned is shown. Switch 1 171a connects to Router 1 175a and to Router 3 175b, Switch 2 171b connects to Router 2 175c and to Router 4 175d. The invention is capable of displaying the actual physical connectivity 170a-170d of these devices in spite of virtualization because it can interpret the virtualization on the routers, even if the connection is only part of a virtual routing domain, which is not capable in existing network management systems. This ability is based on reading management data (e.g. from SNMP MIBs) which are inherent to manufacturer switches, mostly missing at present, combined with specific terminal queries mentioned above to the devices which enhance the data. For example, if a port was in a VRF associated with a virtual router, the SNMP query may not correctly identify the physical connection for various reasons such as device misconfiguration which can place the MAC addresses in differing tables on the two connected devices.

Figure 10:
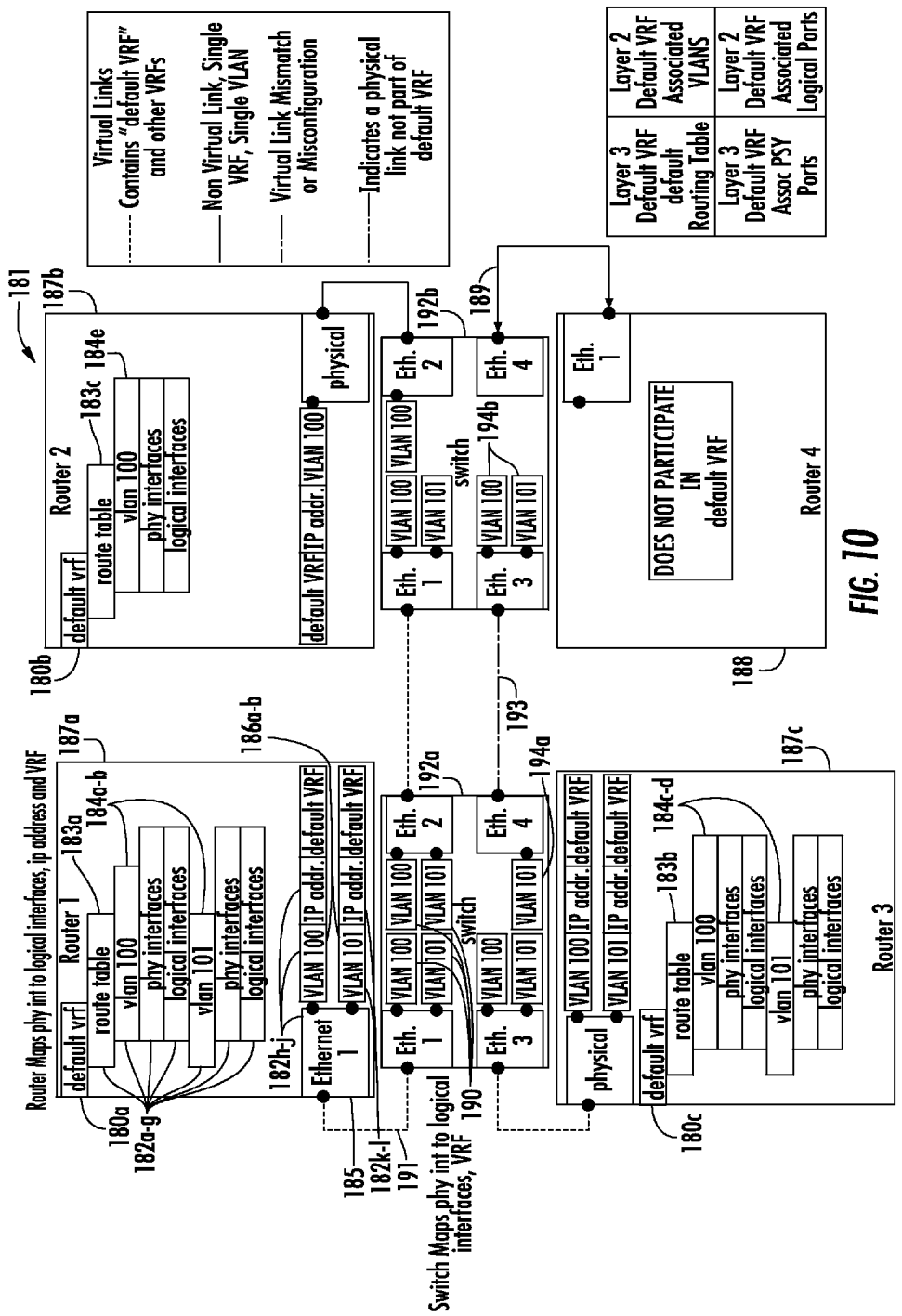
FIG. 10 is a schematic diagram of different versions of a network and both physical and logical details for both devices (i.e. router and switch) and links pertaining to a single "default routing instance" or "default VRF" from the network management system of FIG. 3.

FIG. 10 shows an overlay of the "default" routing virtual instance 180a-c on the physical diagram 181. All data presented to the user via the display 172 of FIG. 9 is present, with several additional significant features. The "default" virtual router 180a-180c and the relationships 182a-182l assigned to that virtual router including routes 183a-183c, VLANs 184a-184e, and physical interfaces 185 which communicate in the calculation of the routing protocol are shown. Router 1 shows the "default vrf" 180a and the route table 183a and associated VLANs 184a-184b, for example, 100 and 101. Each VLAN has associated logical interfaces 186 which are configured on the router and logical interfaces associated with the VLAN also configured. The logical interfaces may involve features from Overlay Network Virtualization such as IPSEC, Generic Routing Encapsulation (GRE) or other tunnel technologies or may include logical subinterfaces such as seen in port virtualization. The same applies to Overlay Network Virtualization which is included in the virtual routing instance logical interfaces such as loopbacks. Logical Layer 3 interfaces for VLANs are associated with the "default vrf" are shown in Router 1, Router 2 and Router 3 187*a*-187*c*, while Router 4 188 does not have a logical connection to the "default routing instance". Router 4 188 does still have a physical connection to Switch 2 189. Each switch exhibits virtualization 190 and thus provides logical connectivity 191 to each router at layer 3. The switches 192*a*-192*b* displayed to the user show a misconfiguration on one of the virtual links 193. As shown by the legend the error exists over the virtualized link which contains VLAN 100 on one side of the link 194*a* and VLAN 100 and VLAN 101 on the other side 194*b*. Various forms of error messages can be sent by existing network hardware, but none show the significance to both the switch device and the impacted Virtual Routing instance here also called the "default vrf". A network engineer who reviews the display shown would be able to identify the resultant affected users with ease based on knowledge of who uses that specific routing instance. The "default vrf" may carry Internet traffic, for example, or other specific data which enables rapid troubleshooting and understanding of impacts to the infrastructure and users if corrected during a service window or outside one. This view 181 associates various groupings of physical and logical feature combinations shown by example in 187*a* on the display 11. An example would be the default VRF 180*a* associated with its various VLANs 184*a*-184*b*, its respective route table 183*a* and physical interface 185. A simple combination of features shows the physical interface 185 associated with two VLANs 186*a*-186*b* and by proximity in the drawing the VLAN's associated IP address.

Another virtual routing instance display 200 is shown which is representative of what the user would see with an overlay of both the physical network and the virtual routing instance created as the "mgmt VRF" 204*a*-204*d*. The "mgmt VRF" extends to each device in FIG. 11 200. The ports shown 201*a*-201*l* are inband data ports, but they could equally be management ports isolated by the network router manufacturer as a control plane port which does not participate in data plane transport of data. Several unique problems are created by such interfaces with virtualization for existing software including missing MISS, missing OIDs, inability of the management interface to provide MIB data on virtual instances, etc. These complications make interpreting logical representations from just a management plane more complex and require unique logic to resolve in the invention 51.

An additional problem for existing network management platforms regarding virtualization is the multiplicity of ports on a single device which may have multiple IP addresses and multiple names when resolved via DNS for example. Existing network management systems base their logic on a single key such as IP address on the management interface or port so resolution of many names, IP addresses on differing ports is not inherent in the software and requires extensive after discovery analysis and hand fitting to resolve the discrepancies. The invention uses careful questions and refining the question as shown in FIG. 4 to reduce this tendency. The invention also uses additional methods to eliminate this problem 51.

It can be seen in FIG. 11 that links may be virtualized 203*a*-203*b* or not 203*c* in virtualized routing instances, and the "mgmt VRF" uses this feature. The query process 45 when applied to the devices 202*a*-202*f* will discover all logical features in use and also the protocol in use. Based on RFC and vendor protocol knowledge the invention will establish features such as neighbors in OSPF and use details of the Link State Advertisement to establish reachability of networks to the "mgmt VRF" the virtual routing instance. By overlaying physical interfaces with logical information such as VLAN the links can be shown as active and that allows this system to draw truly interactive links indicating state by color or other designation. In addition, precise failures of the network can be indicated when specific routes drop out of individual route tables in a given virtual routing instance.

Figure 3:
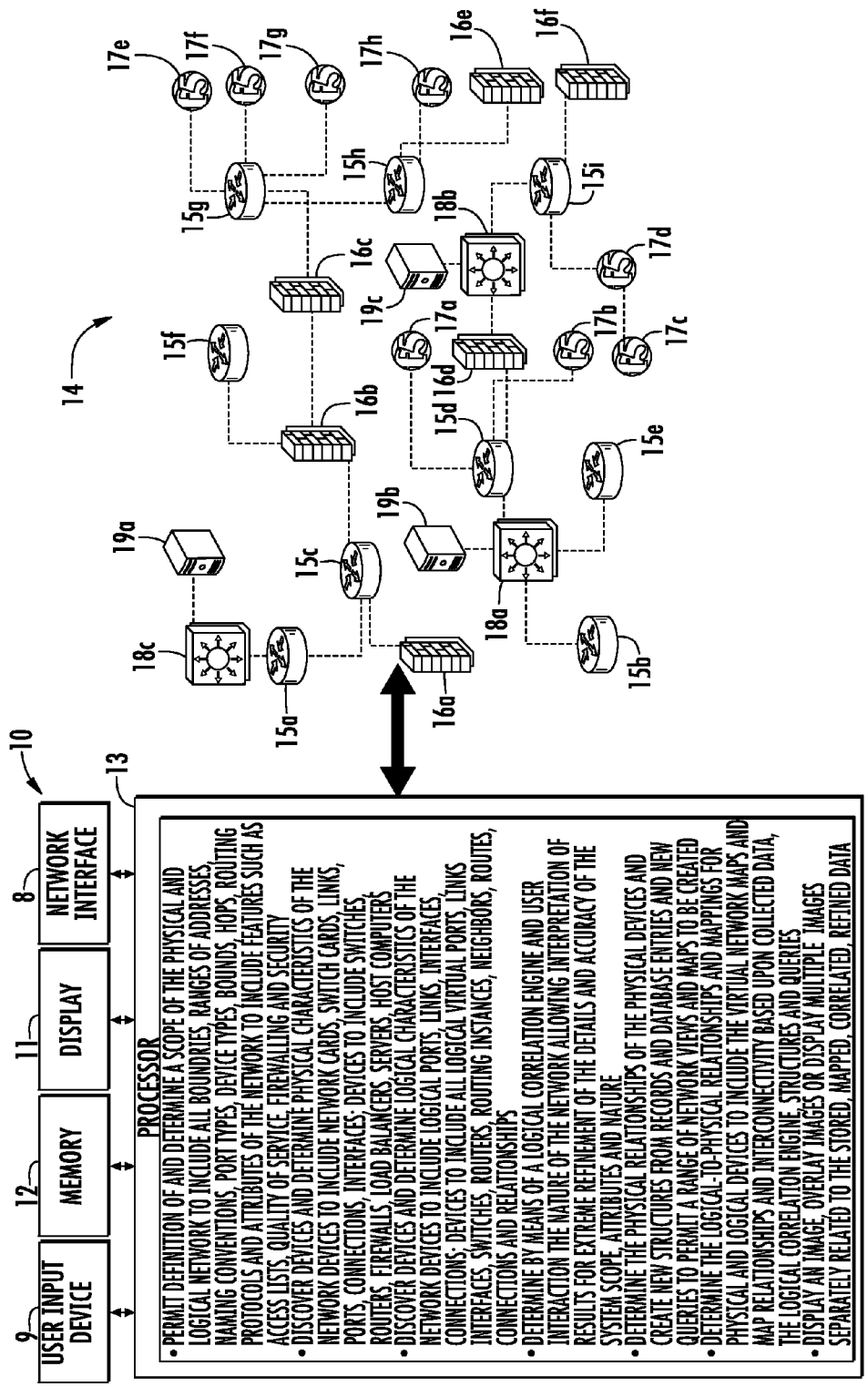
FIG. 3 is a schematic diagram of a network management system, according to the present invention, coupled to an unknown network.

FIG. 11 also may represent the first truly all virtual network as it is not in the "default VRF" which may have connectivity problems if used alone and without a "default VRF" on some manufactures existing equipment. A network configured strictly on a VRF may not be visible as physically connected, but based on the logical knowledge queried by the invention, the physical network can be drawn using differing tables, some which may not be reachable via management protocols like SNMP, but may include command line applications, such as Telnet protocol applications, and issuing commands (e.g. on Cisco "Show ip ospf neighbor vrf all"), and then parsing the output using network engineering knowledge of the command set and authoring logic in the processor shown in FIG. 3, which automates the process.

More specifically, once the connection is established with a respective network device 15*a*-18*c*, the processor 13 is configured to sample communications data, via the established connections, from the plurality of network devices (Blocks 32 & 545). In some embodiments, the processor 13 may extract an entire communication stream from the respective network device 15*a*-18*c* for a set time duration. The processor 13 is configured to then perform correlation processing on the sampled communications data to determine the virtual network map.

In some embodiments, the processor 13 is configured to perform the correlation processing based upon a network routing protocol. The network routing protocol of the correlation processing may comprise the Border Gateway Protocol (BGP), the Open Shortest Path First (OSPF) link-state routing protocol, the Enhanced Interior Gateway Routing Protocol (EIGRP), the Intermediate System to Intermediate System (IS-IS) routing protocol, etc. The health of the routing protocol is dependent upon underlying physical links which is correlated to the "mgmt" virtual routing instance or VRF 204*a*-204*c* in the switches with links 205*a*-205*b*. It can be seen in 200 that no virtual link problems exist in 205*a*-205*b* due to VLAN mismatch as 201*e-h* has equal VLANs at both ends of each physical link shown on display 11.

Figure 12:
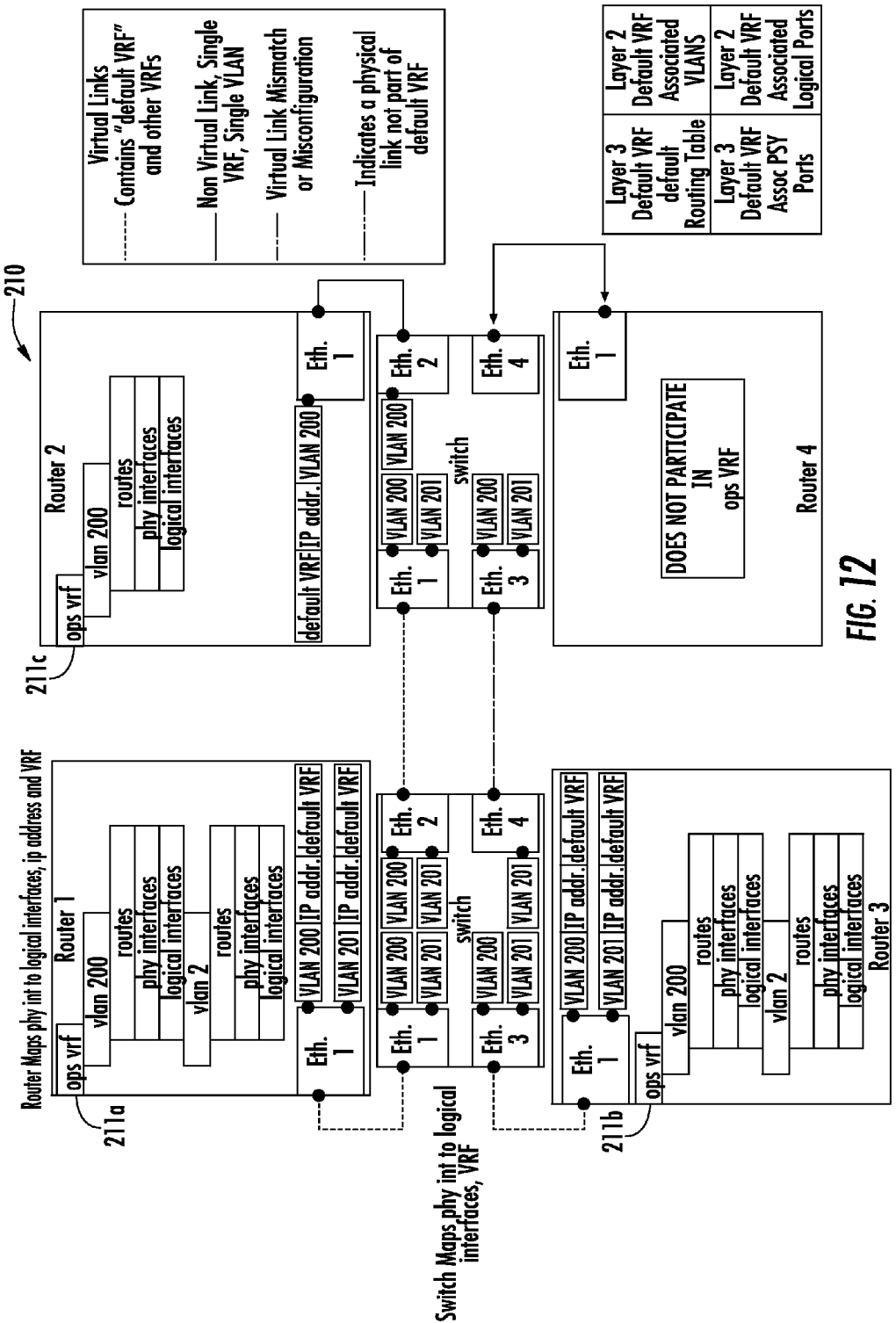
FIG. 12 is a schematic diagram of different versions of a network and both physical and logical details for both devices (i.e. router and switch) and links pertaining to a single "ops routing instance" or "ops VRF" from the network management system of FIG. 3.

A view 210 that includes the physical overlaid with the "ops" virtual routing instance 211*a*-211*c* or "ops VRF" is shown in FIG. 12. This additional view 210 illustrates that there may be many routing instances depending on the network device ability to support the feature. Additionally, there may exist many levels of logical and physical association and logical to logical association in the structure shown to the user in display 11.

Figure 13:
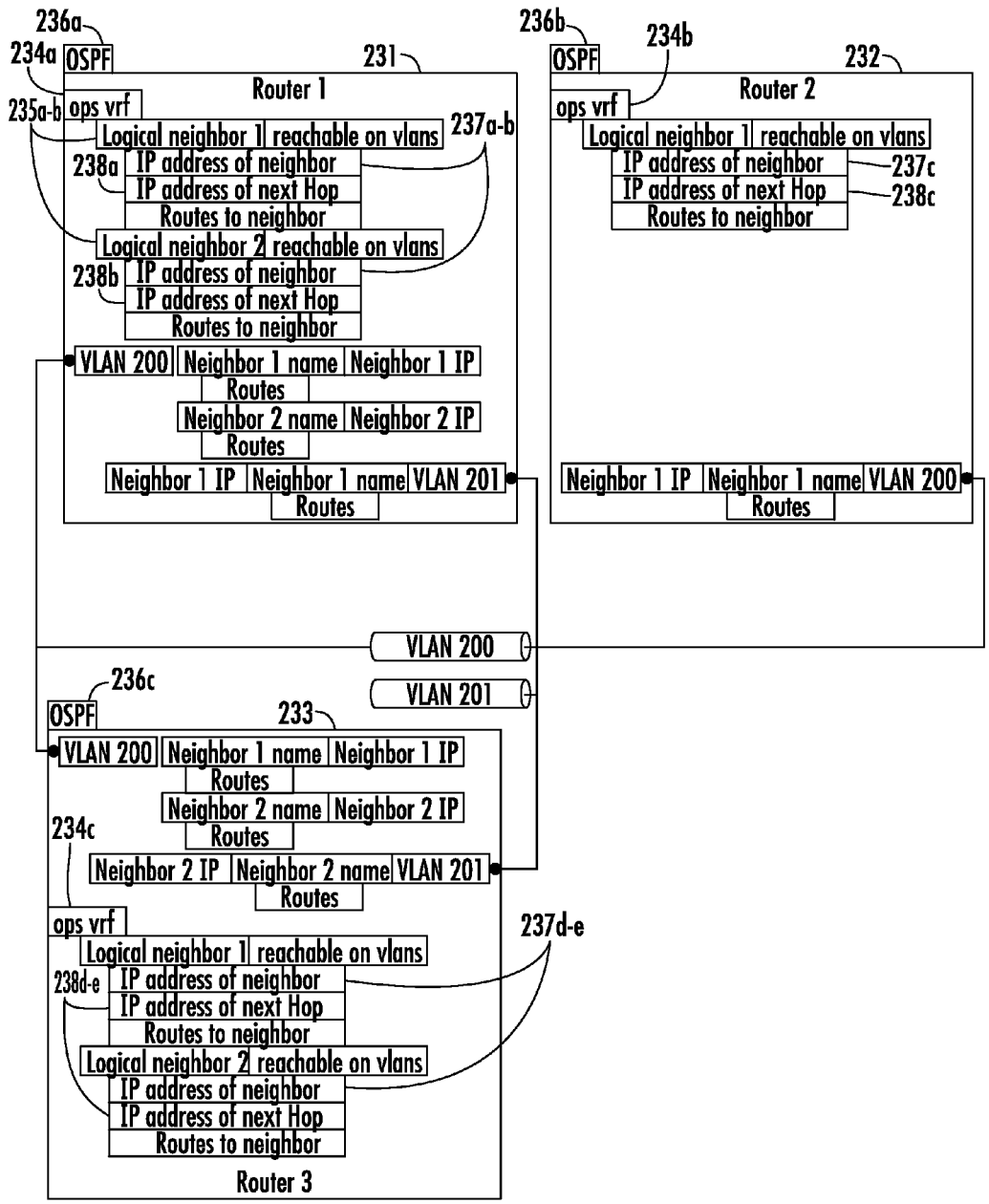
FIG. 13 is a schematic diagram of different versions of a network and logical details for a single "ops" virtual routing instance from the network management system of FIG. 3.

Another user display is shown in FIG. 13, indicating three routers 231-233 participating in a single virtual routing instance "ops" 234*a*-234*c*. The unique VLANs 235*a*-235*b* are shown which participate in this routing protocol 236*a*-236*c*, the only physical grouping however is the "Router 1" 231 or "Router 2" 232 designation to assist the user; no physical port data is shown. A range of logical information which is important to a user's understanding the nature of the VRF on the device, what it can communicate with, and how it is inter-related to other devices is shown in each router; for example, "Router 1" 231 contains all associated logical details for the ops VRF. Logical neighbor loopback address 237a-237e are called out, represented by their next hop address 238a-238e, which may vary by routing protocol, and their representative IP address, which may also vary. This view gives the network engineer rapid understanding of the state of a given virtual router and can decrease time to troubleshoot for root cause in the failure of a virtual router, or failed route process. There are many variations of this sample view for the user with varying levels of physical or logical data, including samples of various fields, such as key routes; the image shown is representative of what the user may experience.

Figure 14:
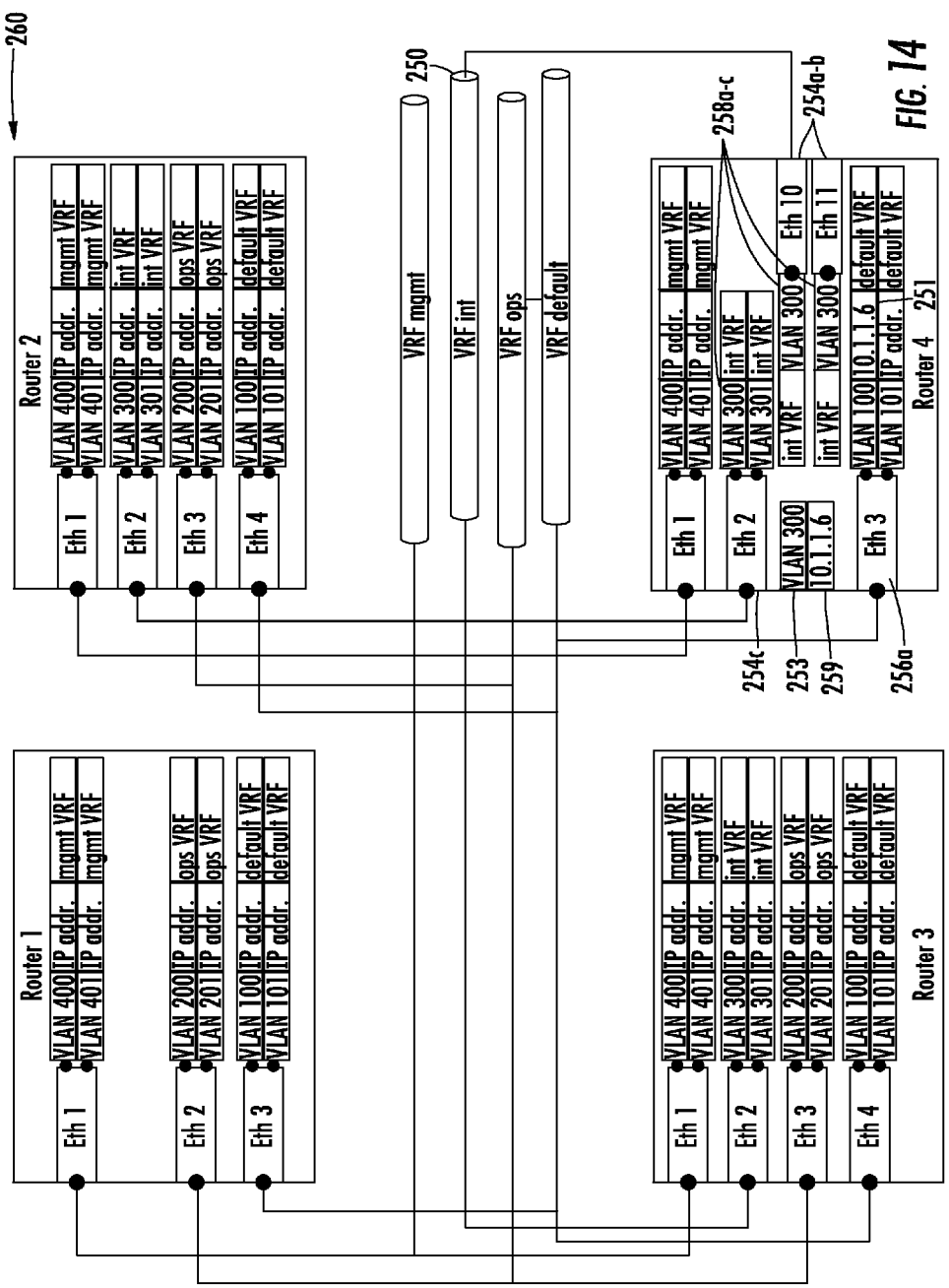
FIG. 14 is a schematic diagram of different versions of a network and multiple virtual routing instances or VRFs overlaid on the physical drawing of devices, showing some logical and physical relationships (ports or interfaces) from the network management system of FIG. 3.

Referring now to FIG. 14 which shows additional detailed logical structure; the overlap of IP addresses may occur which would confuse existing network management software, as would differing DNS names for the same IP address range in differing VRFs. For example, a single router may have in its "int VRF" 250 a Routed interface 256a, also called a Layer 3 interface or port with an IP address of 10.1.1.6 251 corresponding to Ethernet 3 256a, and at the same time a Layer 3 VLAN interface 253 associated with three Layer 2 ports 254a-254c, 257 in "VLAN 100" 258a-258c with the Layer 3 VLAN interface 253 also having an IP address of 10.1.1.6 259 with differing or similar subnet mask in the "int VRF". Each 10.1.1.6 IP will have a unique MAC address and may have a unique name in DNS confusing existing network management systems. The invention is virtual device aware and has no such limitation; each view would show only the respective interfaces without confusion in this view 260.

By enabling the user to see multiple virtual features, such as routing instances as shown in 260, a very rapid broad knowledge of the health of a large network with multiple or many virtual instances may be ascertained. For example, the views of features belonging to key customers of the network may be saved and stored for later, such as related virtual instances. A blend of physical (E.g. ports) and virtual information (VRF, IP Address, VLAN) in 260 gives physical ports or interfaces and their association with logical interfaces or VLANs and the relevant IP addresses. This can be used with prior views to validate if IP addressing is in error on the routing instance perhaps causing a routing error and permitting some debugging of the root cause of a network problem such as routes not being present in a routing table. The multiple virtual router structure, physical and logical port structure and inter-relationships in 260 are shown on display 11.

Figure 15:
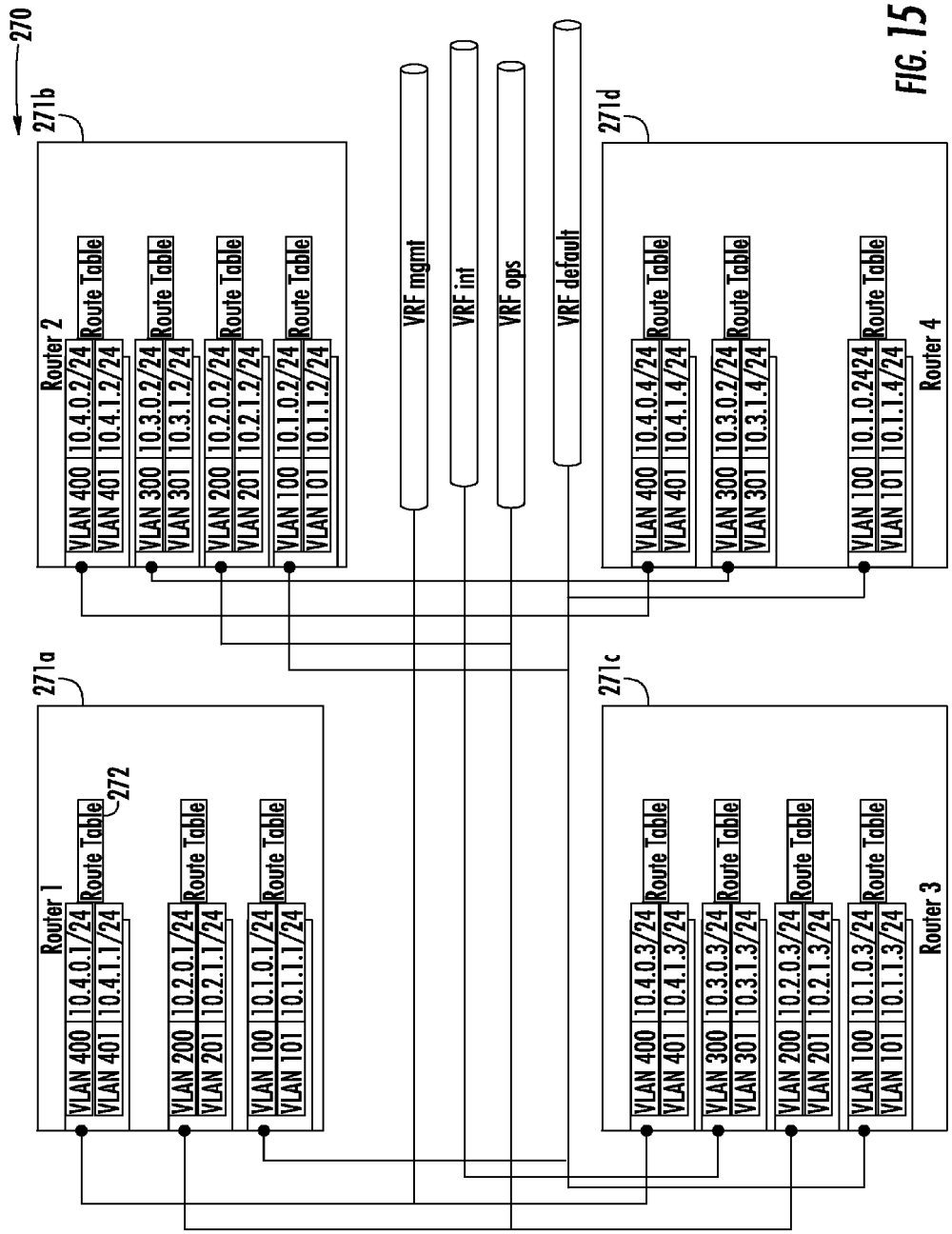
FIG. 15 is a schematic diagram of different versions of a network and multiple virtual routing instances or VRFs overlaid on the physical drawing of devices, showing some logical relationships from the network management system of FIG. 3.
Figure 16:
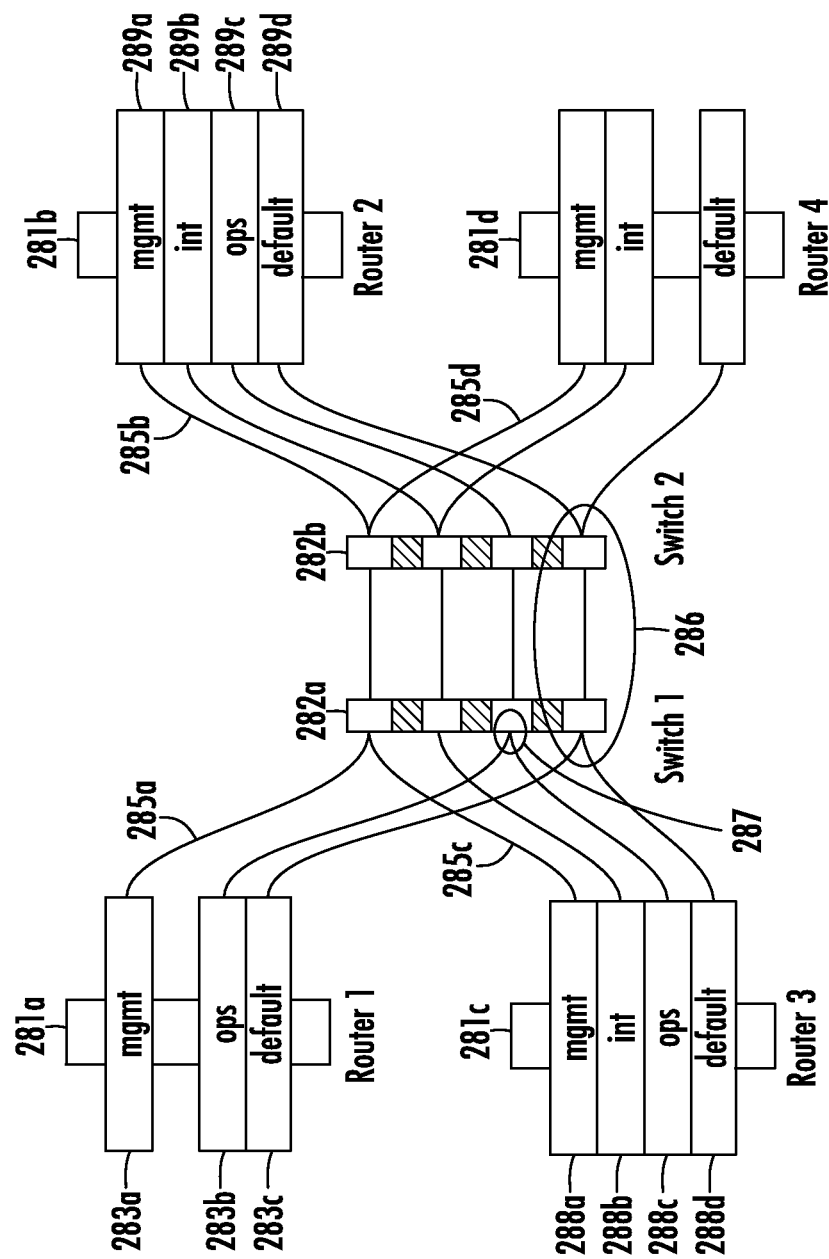
FIG. 16 is a schematic diagram of different versions of a network and multiple virtual routing instances or VRFs overlaid on the physical drawing of devices, showing connectivity between the virtual routing instances from the network management system of FIG. 3.
Figure 17:
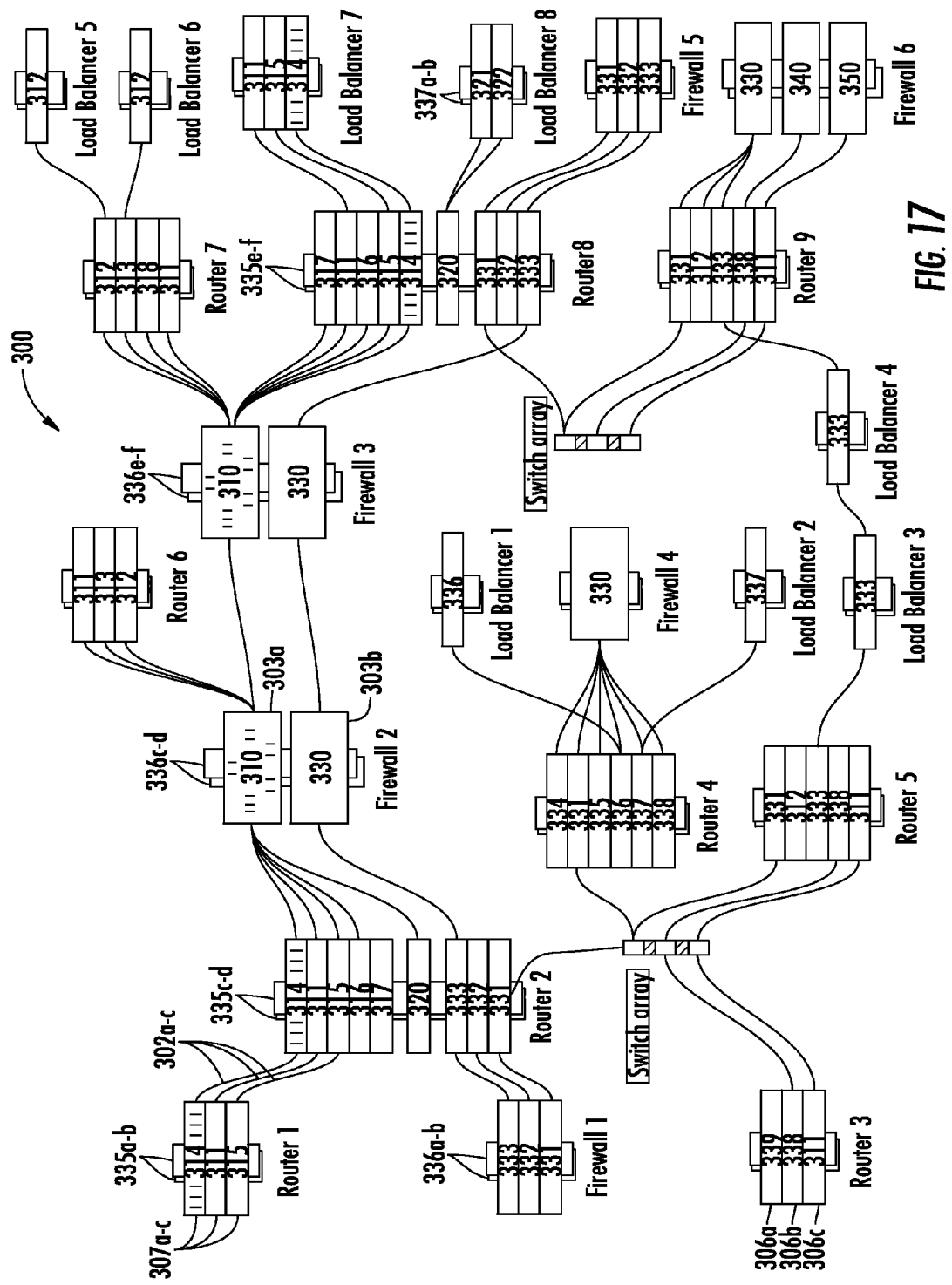

A logical Multi-VRF view 270 is shown in FIG. 15 which eliminates all but the grouping data by "Router 1" 271a for example, but shows a route table snippet or gives a button 272 by which to open a popup window to a route table. It may also have been represented as strictly logical without physical association thus in a view without 271a-271d. This mixed physical and logical view method makes it convenient to use a single interface to the user to access multiple vendor devices. Some vendors use many command formats making it time consuming for a user to mentally context switch from one vendor's configuration language to another. This view can have many levels and intricacies of logical data in addition to what is shown.

Other view methods, such as that shown in FIG. 14 come out of the extensive physical and logical data available to the system. Here, the 4 routers 281a-281d and switches 282a-282b are represented strictly by the routing instances 283a-284d indicating which are connected to each other (E.g. 285a-285d) helping with troubleshooting any device misconfiguration. Each VRF or routing instance (E.g. 283a-283c) is shown in a single block associated with a network device (E.g. 281a), here a router. Router 1 281a is shown with 3 routing instances, "mgmt" 283a, "ops" 283b and "default" 283c. Router 2 281b shows 4 routing instances, "mgmt" 284a, "ops" 284c, "int" 284b and "default" 284d. Each instance is connected to a switch via a link (e.g. 285a); the link may be displayed in real time accurately as functional or non-functional based on knowledge of neighbors and states of the devices via query. Each VRF or routing instance may or may not be represented in the switch 282a-282b, a lightweight (e.g. brief, abbreviated) manner shown in the drawing indicates 4 isolated virtual routing instances (one represented by 286) which are being transported by the switches, or as is industry appropriate to use: "switched" by each switch. Each line between the two white boxes on 282a and 282b represent a connection of the attached virtual routing instances. In the case of 286, two curved lines attach to the white box on 282a showing the terminate on the switch and the can communicate, thus the "default" routing instances or VRFs on 281a and 281c, namely 283c and 288d can exchange packets and routes. Just as 289d which connects to the right white box in 286 on switch 282b can communicate across the connecting line between 282a and 282b in 286 making all able to pass packets and routes. It is easily seen by a person viewing display 11 that router 1 281a does not participate in the "int" routing instance or VRF and thusly sees no such traffic, nor can it communicate to devices which are a part of that path. Each reflective interface 287 on the switch, such as those having two lines which appear to terminate in the same white space are connected, as are the two parallel white boxes on each switch which have a line or logical connection shown to connect the two white boxes.

Figure 17:
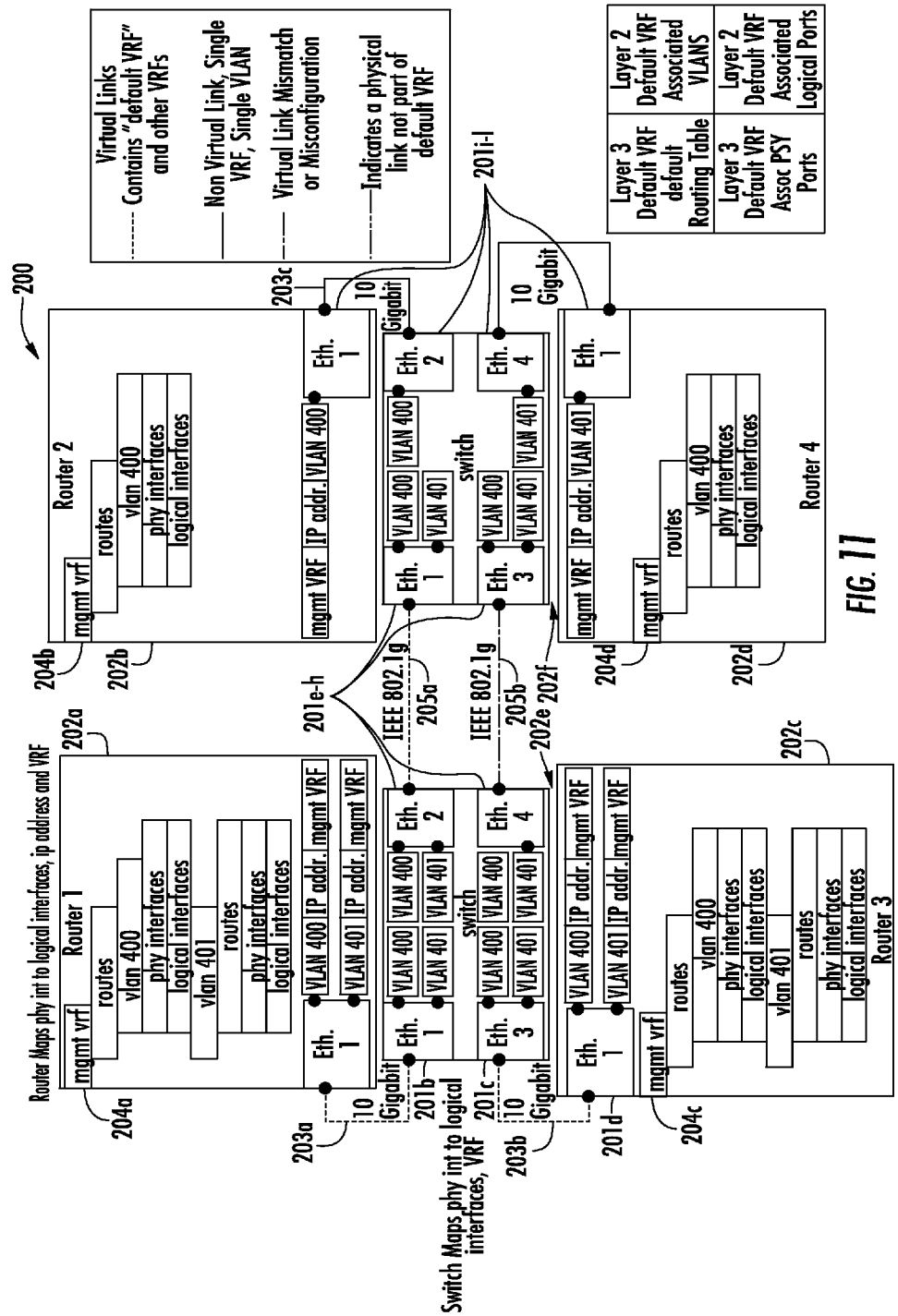
FIG. 17 is an image of the virtual network map and the physical network map from the network management system of FIG. 3.

This simplistic view 280 is powerful in that it extends very quickly to show many sets of interconnected datacenters and networks, here represented in FIG. 17 by numbers for visual ease. There is a correlation between views 300 and 14, for example, the router 15a in 14 has become represented by two routers 335a-335b and now possesses virtual routing information 307a-307c connected to other virtual routing instances in 335c-335d by virtual links and logical connections 302a-302c. It can be seen that routing instances may interconnect on differing devices such as can be seen between "Router 2" 335c-335d and "Firewall 2" 336c-336d. The "310" virtual routing instance 303a on the firewall 336c-336d connects to the "314", "311", "315", "316" and "317" virtual routing instances on the router 335c-335d. This interconnection between virtual routing instances may mean that if firewall rules do not prohibit interconnection, and if there is a redistribution of routes that connectivity in one direction or bidirectional fashion may occur. Clearly the complexities are difficult to envision or even conceive from looking at 14 and a view such as that shown here in 300 can be of great value to network engineers. These types of drawings are important in showing packet paths and isolating network problems, misconfiguration and projects for improving reliability, stability and services.

Referring again to FIGS. 3-4, the User Input device 9 is configured to accept input from the network engineer or operator 33. The processor 13 is configured to then perform correlation processing on the input to determine the virtual network scope. The network interface is configured to attach to a network 14.

The processor 13 is also configured to display an image on the display 11 related to the stored mapping data (Blocks 54 & 557). For example, as shown in FIG. 17, the processor 13 provides an image of the network 14 from FIG. 3. In this illustrative image, the displayed image comprises a combined map image based upon both the physical network map and the virtual network map (Block 54).

Moreover, for each physical network device, each of the virtual network devices provided is also depicted. In particular, the router 15*b* comprises a plurality of virtual routers 306*a*-306*c*, and the firewall device 16*b* comprises a plurality of virtual firewalls 303*a*-303*b*. Also, the image also includes indicators for multiple co-located physical devices. For example, the router device 15*a* includes two physical router devices (stacked vertical rectangles), and the aforementioned three virtual routers 306*a*-306*c* supported by the two physical router devices.

Also, in the illustrated image, several virtual devices 335*a*-335*b*, 335*c*-335*d*, 336*c*-*d*, 336*e*-336*f*, 335*e*-335*f* and 337*a*-337*b* are stippled to indicate their membership in a particular virtual network. In some embodiments, the processor 13 may be configured to provide coloration to differentiate each virtual network, virtual paths and associated routes, neighbors and associated logical and physical interfaces in the network 14. Advantageously, as shown in FIG. 5, the processor 13 is configured to be able to relate the physical network devices with co-located virtual devices. The "314" virtual routing instance or VRF is connected from 335*a*-335*b* to 337*a*-337*b* showing a unique path through the network permitting troubleshooting when viewed on display 11.

Moreover, the processor 13 is configured to have access to the logical extents of each virtual network and the related physical device dependencies. Accordingly, when the network event affects a physical device, the processor 13 can quickly determine changes in the mapping data and promptly provide indication on the display 11.

Figure 18:
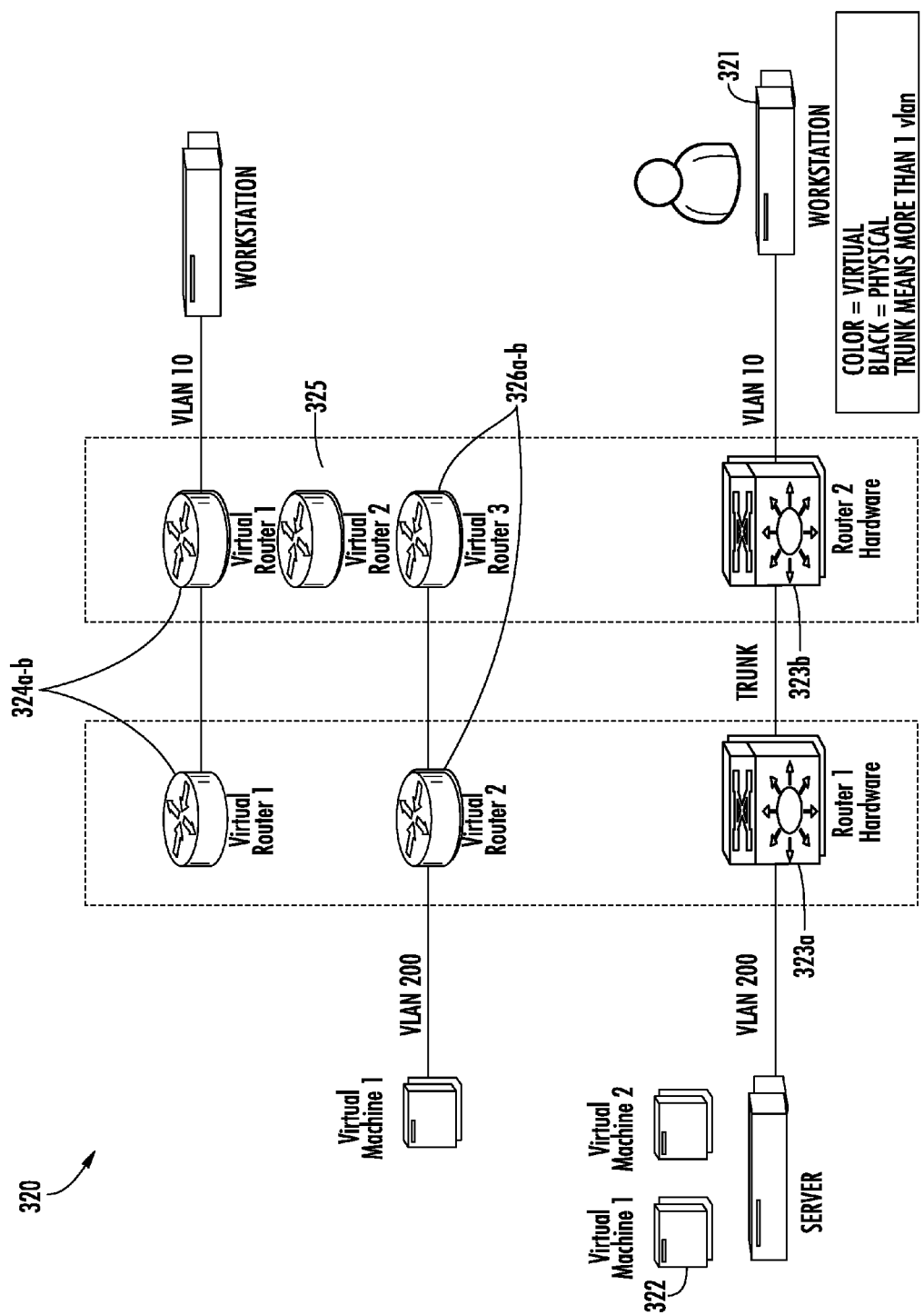
FIG. 18 is a schematic diagram of a network trace between two devices (i.e. workstation and a virtual machine) mapped by the network management system of FIG. 3.
Figure 20:
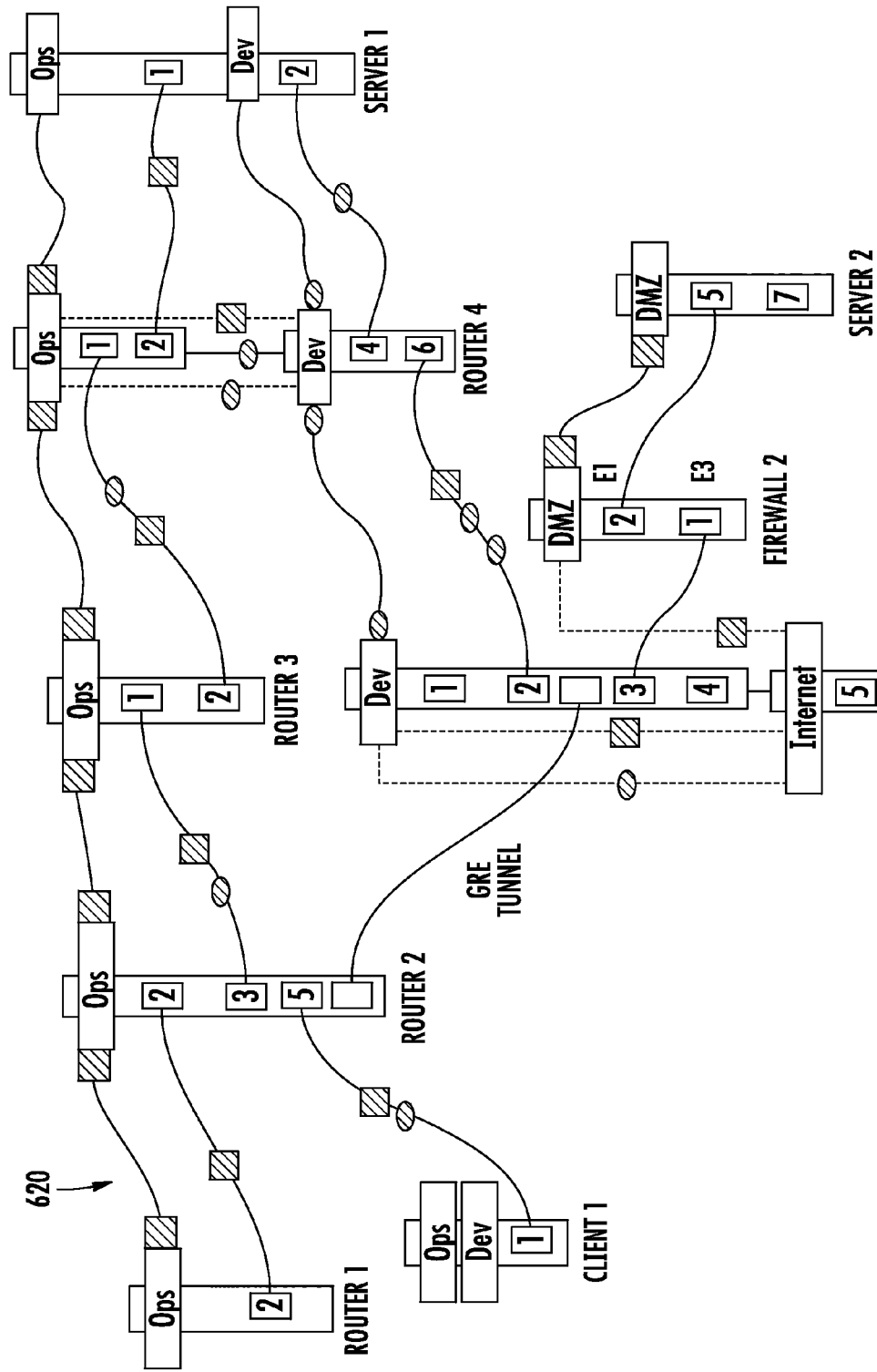
FIG. 20 is an alternative schematic diagram of a network mapped by the network management system of FIG. 3.
Figure 21:
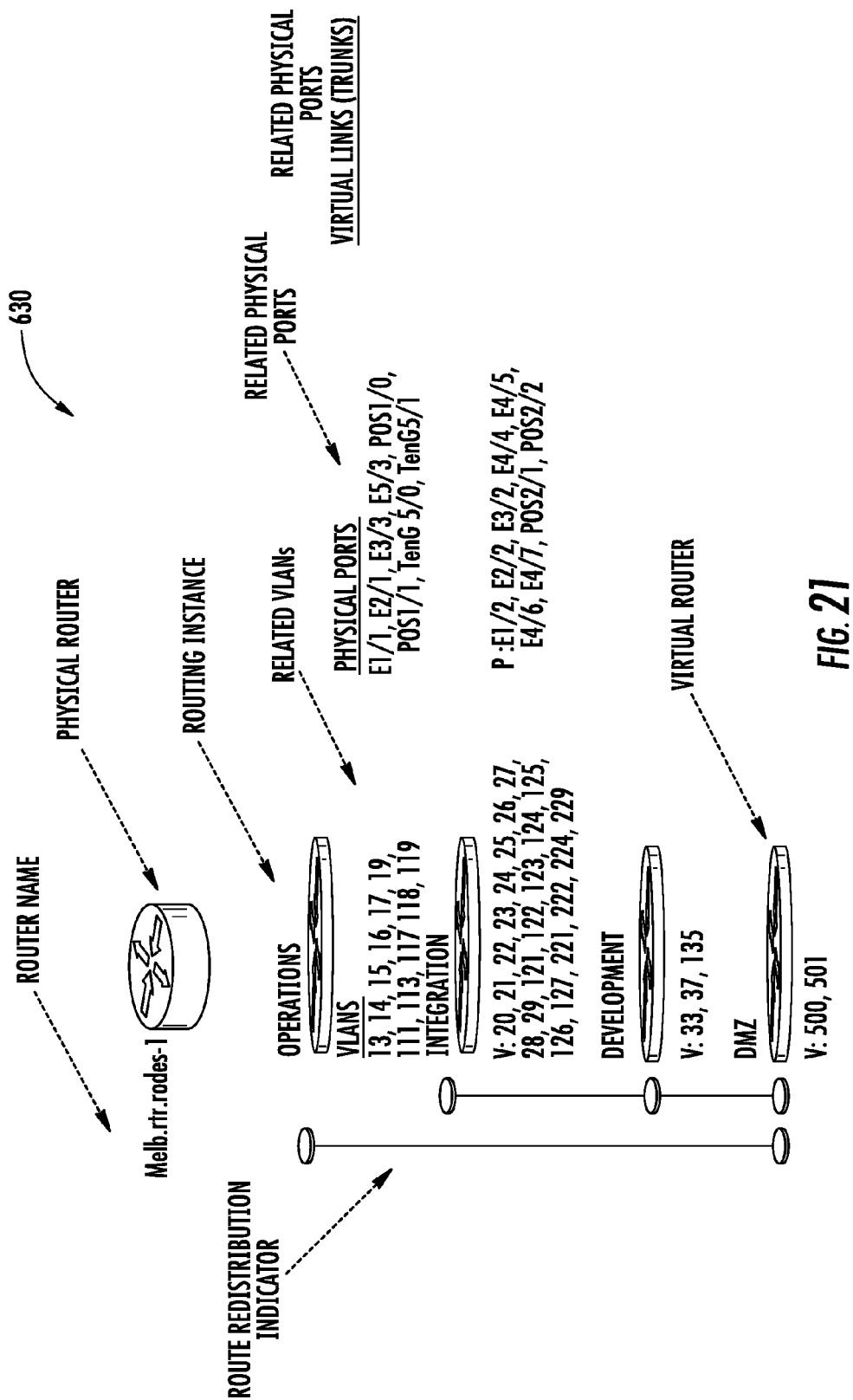
FIG. 21 is an alternative schematic diagram of a device mapped by the network management system of FIG. 3.

A high level simplified view 320 in FIG. 18 for two devices 321-322 may be for use in a presentation to management who needs to understand network complexities including virtualization device for matters like post mortem after a network event has occurred, perhaps affecting the company financially. These types of view are possible, due the collecting and interaction with virtualization efforts in industry such as "Open Stack", which is primarily a layer 2 overlay network at this time, or Virtualization managers such as Xen, VMWare, KVM, etc. Interfaces built into the system are important to providing extensibility of the system in an environment of evolving virtualization which is anticipated for the foreseeable future. Physical plane shown on the display 11 is represented in part by 323*a*-323*b* and the logical plane is shown by 324*a*-324*b*, 325, 326*a*-326*b*. Alternative views 90, 620, 630 from FIGS. 19-21 represent a range of possible solutions to providing users a way to see their network with the method presented.

Figure 19:
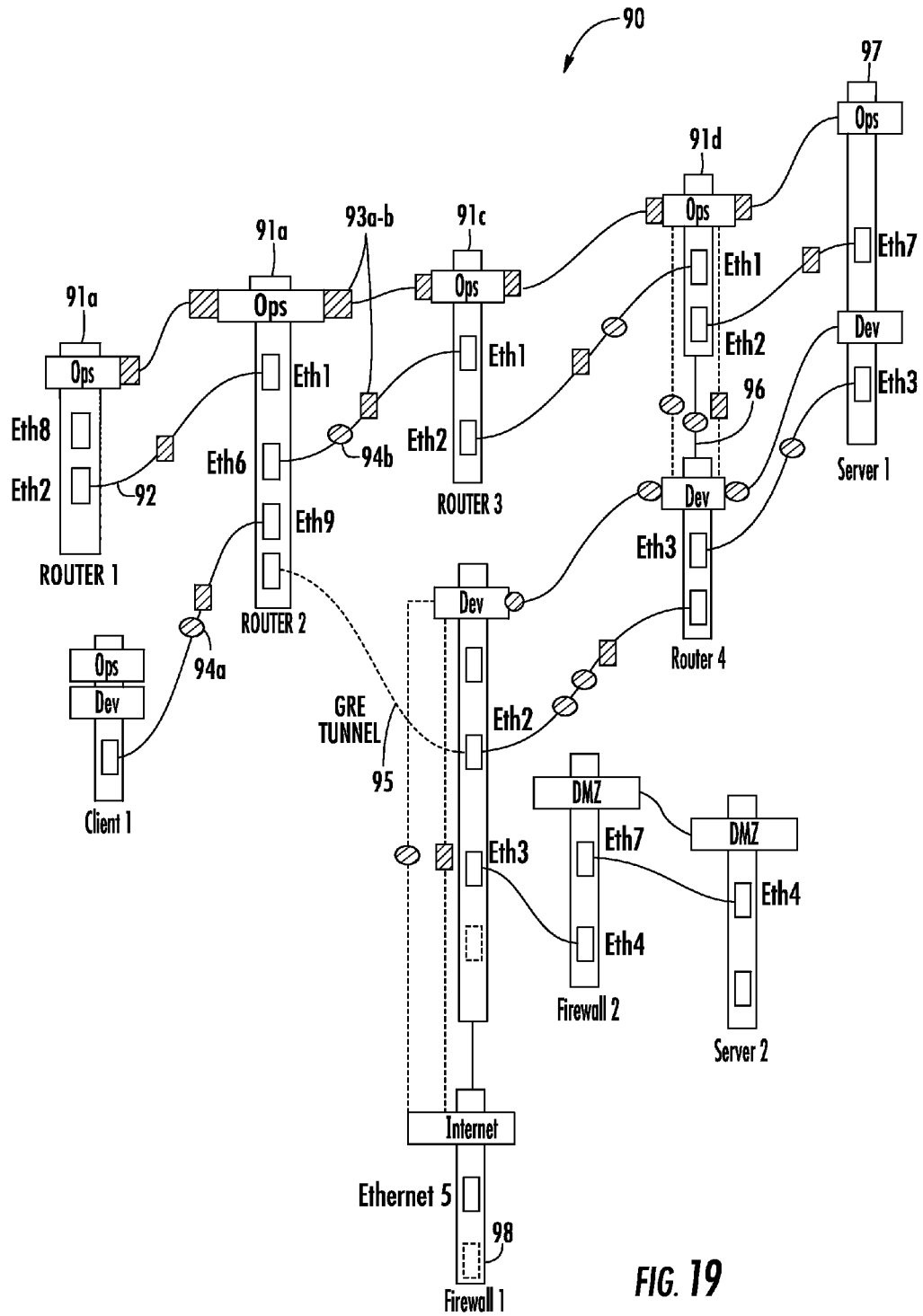
FIG. 19 is an alternative schematic diagram of a network mapped by the network management system of FIG. 3.

Referring now to FIG. 19, an image 90 of a virtual network map (one virtual routing instance is illustratively named "Ops") may comprise of a range of networks. The Operations network is a VRF instance on a vendor's physical router. The physical routers 91*a*-91*d* are listed with their logical names, i.e. "Routers 1-4". "Router 1" 91*a* is a physical device with two physical Ethernet ports which are associated with the "Ops" routing instance. The curved lines between Operations instances on "Router 1" 91*a* and "Router 2" 91*b* indicate that the logical routers can see and interact with each other. They do this through the physical connection "Ethernet 2" on "Router 1" 91*a* and "Ethernet 1" on "Router 2" 91*b*, indicated by the line 92 that connects the two ports associated with "Ops".

The markers, 93*a*-93*b* being a square and 94*a*-*b* being an oval, indicate associations of the physical with the logical, as does the name Ops being associated with the Router 1 91*a*. A logical GRE interface in Router 2 91*b* shows how an overlay network is represented, in part by indicating a dashed line 95 with all ports and links passed through or over. The solid line 96 connecting two Virtual Routers on "Router 4" 91*d* shows the ports which are associated with the Ops instance and the ports associated with the Dev (i.e. development) instance and also shows the logical GRE tunnel passing between logical instances on the router indicating configuration that would permit it to occur, illustrated by the oval on 96, which may or may not be a configuration error on the part of the network. The virtual network map also includes a server 97, and a firewall device 98.

View maintenance for links or other logical connectivity requirements may mean that in some instantiations the invention may extract a communication stream from the respective network device using a tool such as Wireshark on Cisco Nexus devices for a set time duration.

Figure 22:
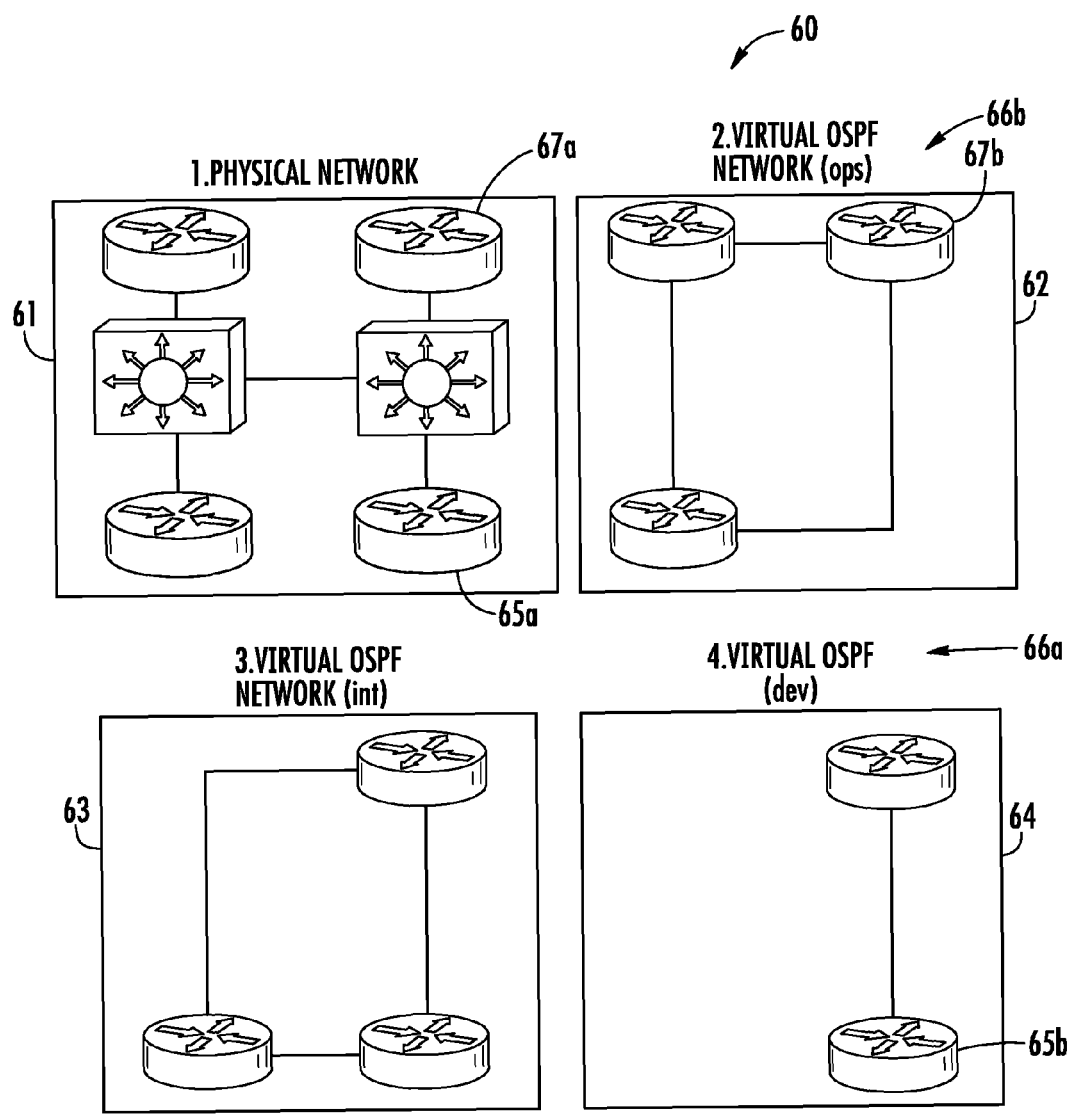
FIG. 22 is a representation of three virtual routing instances and how they can influence other maps or views mapped by the network management system of FIG. 3.

Additionally, the processor 13 may be configured to readily swap views of the stored mapping data on the display 11. For example, referring now to FIG. 22, a diagram 60 illustratively includes four views 61-64 of a simple exemplary network. The first view 61 comprises a physical network view, and the second view 62 comprises a virtual OSPF network (operations, i.e. used for the business operations). Also, the third view 63 comprises a virtual OSPF network (integration, i.e. a test network used prior to migrating a solution to operations), and the fourth view 64 comprises a virtual OSPF network (development, i.e. for testing and development). The processor 13 may be configured to display physical and virtual mapping data in a single network map, or in multiple logical views of the physical topology, or logical network topology in a single view, on a single screen, or on a single plot or single printable diagram.

In some embodiments, the processor 13 may present all virtual network maps in one single view. Also, the processor 13 may present virtual network maps as an overlay over the physical network map. The processor 13 may be configured to display a plurality of security zones, as instantiated by virtualization of network devices 15*a*-18*c*, and to also note configuration errors in the network 14.

Advantageously, when a network event occurs, the image may be modified automatically to switch to a most relevant view. For example, if an application process running a router 15*a*-15*i* has a problem, causing one or more virtual routers to fail, for example, affecting only the development virtual network or a route associated with the development network, the processor 13 may automatically switch the image view to the developer network in question. In another instance, where the physical router device fails, affecting the operational network, the processor 13 may switch to the physical network view and highlight the failure with a colored indicator. Advantageously, this may reduce troubleshooting time for network events. Indeed, in some embodiments, the views are updated in real time, automatically.

Advantageously, the network management system 10 is capable of associating the logical/virtual topology with the related physical elements and logical sub-elements. The network management system 10 may also display multiple virtual network maps defined on network equipment using network virtualization to include overlapping IP address ranges on network devices 15a-18c or network hosts 19a-19c (such as servers, clients, embedded devices). Helpfully, the network management system 10 is capable of displaying individual virtualized network or multiple virtualized networks, irrespective of the number of virtual instances, Virtual Routing and Forwarding (VRF) instances, contexts or other virtual framework implementations configured on network equipment.

The network management system 10 may also provide a physical view of the network which contains logic to permit certain routing instances when failed to pass through to the physical map, while others do not influence the physical map. Logic is present to permit the router 65a in 60 to not present an indication to a specific user role an indication that a less significant virtual routing instance 66a-66b has a router with a problem 65b, whereas a more significant routing instance 66a-66b indicates to the physical map the probable with the 67a router by passing the state of the 67b router to it for a display change such as turning the physical router red based on the importance of the ops routing instance 66b.

Also, the network management system 10 may provide a single network on virtualized hardware that uses a mix of vendor virtualization technologies without requiring a separate network interface on each virtual network. Also, the network management system 10 may provide a display of logical paths between virtual structures created by network virtualization. The network virtualization involves virtual routers, routing instances, routing contexts, security contexts and logical structures in network devices capable of creating isolated routing paths for packets based upon isolation techniques by vendors.

Additionally, the network management system 10 may visualize a multiple logical-level network, which permits personnel to solve network problems associated with packets that follow complicated flows across multiple virtual routing domains. The network management system 10 may reduce the time to solve network problems significantly, estimated in its first implementation to reduce troubleshooting in a virtualized network by 90%. The network management system 10 may provide similar benefits for virtual router misconfiguration, and for virtual router accidental interconnect.

Another aspect is directed to a method of operating a network management system 10 for a network 14 comprising a plurality of network devices 15a-18c. The method includes using a memory 12, a network interface 8 and processor 13 coupled therewith to send queries to the plurality of network devices 15a-18c, obtain responses from the plurality of network devices based upon the queries, determine a physical network map for the plurality of network devices based upon the responses, and establish connections with at least some of the plurality of network devices. The method further includes using the memory 12 and processor 13 coupled therewith to determine a virtual network map for the plurality of network devices 15a-18c based upon the responses and the established connections, store mapping data related to the determined physical network map and virtual network map in the memory, and display an image on a display 11 related to the stored mapping data.

Another aspect is the executable instructions stored on a non-transitory computer readable medium. When they are executed, they cause a processor 13 to perform steps for operating a network management system 10 for a network 14 comprising a plurality of network devices 15a-18c. The steps comprise sending queries to the plurality of network devices 15a-18c, obtaining responses from the plurality of network devices based upon the queries, determining a physical network map for the plurality of network devices based upon the responses, and establishing connections with at least some of the plurality of network devices. The steps also include determining a virtual network map for the plurality of network devices 15a-18c based upon the responses and the established connections, storing mapping data related to the determined physical network map and virtual network map in the memory, and displaying an image on a display 11 related to the stored mapping data.

Figure 23:
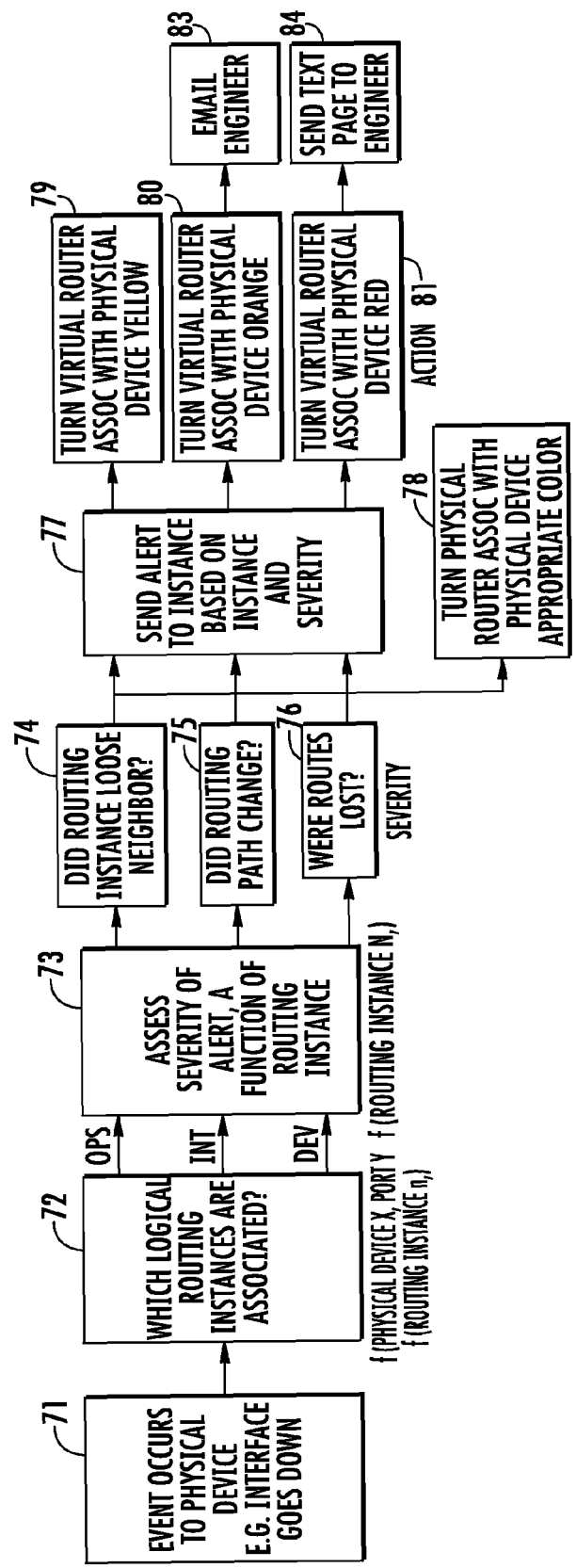
FIG. 23 is another flowchart for operating the network management system of FIG. 3.
Figure 24:
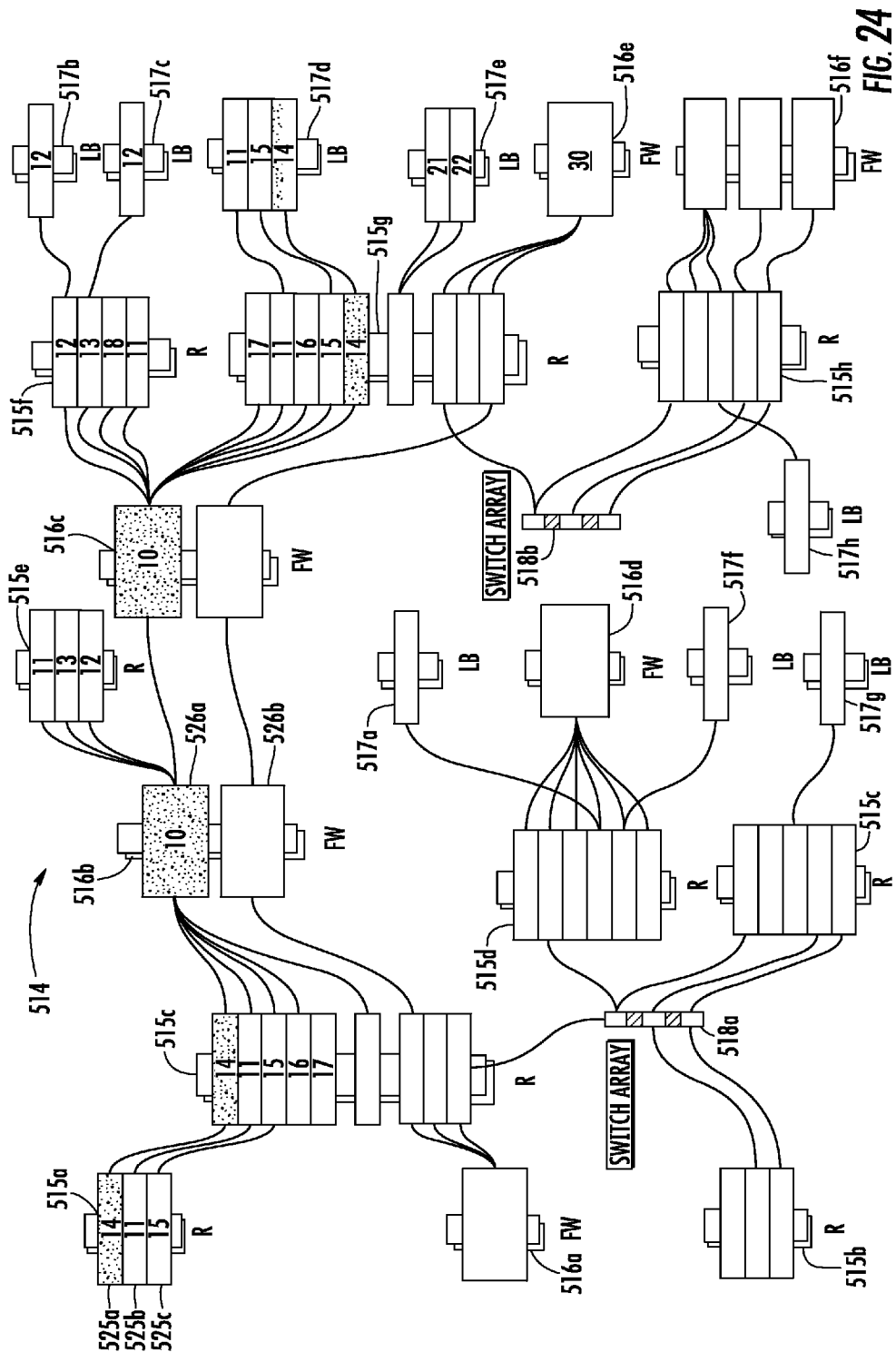
FIG. 24 is an image of the virtual network map and the physical network map from the network management system of FIG. 1.

Referring now additionally to FIG. 23, a flowchart 70 illustrates another embodiment of the method for operating the network management system 10. In particular, this embodiment relates to a method for handling the aforementioned network events. At Block 71, the processor 13 detects an event happening to a physical device, and at Block 72, the processor determines which logical routing instances (i.e. virtual) are associated to the physical device. At this step, the processes for events affecting the operations network, the development network, and the internal network are separated into individual flows. At Block 73, the processor 13 determines the severity of the network event, and the function of the routing instance.

At Block 74, for operational network events, the processor 13 determines whether the routing instance lost any neighboring devices. At Block 75, for internal network events, the processor 13 determines whether there are any routing path changes. At Block 76, for development network events, the processor 13 determines whether any routes were lost.

At Block 78, in the physical network map, the associated device indicator is changed in color to indicate the network event. At Block 77, the processor 13 generates an alert based upon the instance and the severity. At Blocks 79-81, the processor makes other needed coloration indicator changes to appropriate maps. At Blocks 83-84, the processor 13 generates alerts (e.g. email or short message service (SMS) messages) for the appropriate network staff. In some embodiments, the processor 13 may utilize advanced logic rules to determine the appropriate personnel to contact for the network event.

More specifically, the choice to turn a router red on a screen can be made if the link affects an operations link, but a development link would not have the same impact to the physical network view. For example, if the link goes down in diagram 4, but it does not affect diagram 2's traffic, diagram 2 and diagram 1 will not show a change. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used in this document, the term "comprising" means "including, but not limited to". Furthermore, to the extent that the terms "including", "includes", "having", "has", "with", or variants thereof are used in either the detailed description and/or the claims, such terms are intended to be inclusive in a manner similar to the term "comprising."

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

That which is claimed is:

1. A network management system for a network comprising a plurality of network devices, the network management system comprising:
    a display;
    a memory; and
    a processor coupled to said display and memory and configured to
        send queries to the plurality of network devices,
        obtain responses from the plurality of network devices based upon the queries,
        determine a physical network map for the plurality of network devices based upon the responses,
        establish connections with a group of the plurality of network devices,
        sample communications data, via the established connections, from the group of the plurality of network devices,
        perform correlation processing on the sampled communications data and based upon a network routing protocol,
        determine a virtual network topology map for the plurality of network devices based upon the responses, the established connections, and the correlation processing,
        store mapping data related to the determined physical network map and virtual network topology map in said memory, and
        display an image on said display related to the stored mapping data, the image comprising virtual network elements from the virtual network topology map overlaid with associated physical network elements from the physical network map.

2. The network management system of claim 1 wherein said processor is configured to:
    determine for each network device a device type from a plurality of different device types based upon the responses; and
    establish the connections with the group of the plurality of network devices based upon determined device types.

3. The network management system of claim 1 wherein said processor is configured to determine the virtual network topology map for the plurality of network devices by at least determining, for each respective network device, at least one virtual routing instance and an associated port, and at least one neighboring device and associated routes.

4. The network management system of claim 1 wherein said processor is configured to detect at least one network event in the network, and determine potential changes to the mapping data resulting from the at least one network event.

5. The network management system of claim 4 wherein said processor is configured to determine whether the potential changes exceed a threshold level, and if so, generate an alert message.

6. The network management system of claim 5 wherein said processor is configured to provide coloration to the image to indicate a level of the potential changes.

7. The network management system of claim 1 wherein said processor is configured to display the image as a combined map image based upon both the physical network map and the virtual network topology map.

8. The network management system of claim 1 wherein said processor is configured to send the queries as management protocol messages.

9. The network management system of claim 1 wherein said processor is configured to display on said display a physical and logical overlay indicating active links by color.

10. The network management system of claim 1 wherein said processor is configured to display on said display an indication of route dropout in individual route tables in a given virtual routing instance.

11. The network management system of claim 1 wherein said processor is configured to display on said display a host virtualization including at least one of: a physical interface structure; a logical virtual local area network (VLAN) structure; a physical connection structure; a logical connection structure; a logical path structure; a physical host structure; and a logical host structure; and wherein said processor is configured to display on said display relationships including host, and port and link virtualization.

12. The network management system of claim 1 wherein said processor is configured to display on said display a switch virtualization including at least one of: a physical interface structure; a logical VLAN structure; a physical connection structure; a logical connection structure; a logical path structure; a physical switch structure; a logical switch structure; and a logical switching structure; and wherein said processor is configured to display on said display relationships including host, and port and link virtualization.

13. The network management system of claim 1 wherein said processor is configured to display on said display a router virtualization including at least one of: a physical interface structure; a logical VLAN structure; a physical connection structure; a logical connection structure; a logical path structure; a physical router structure; a logical router structure; and logical routing structure; and wherein said processor is configured to display on said display relationships including host, and port and link virtualization.

14. A network management system for a network comprising a plurality of network devices, the network management system comprising:
    a display;
    a memory; and
    a processor coupled to said display and memory and configured to
        send management protocol messages to the plurality of network devices,
        obtain responses from the plurality of network devices based upon the management protocol messages,
        determine a physical network map for the plurality of network devices based upon the responses,
        establish connections with a group of the plurality of network devices,
        sample communications data, via the established connections, from the group of the plurality of network devices,
        perform correlation processing on the sampled communications data and based upon a network routing protocol for determining for each network device at least one virtual neighbor and an associated at least one virtual route, determine a virtual network topology map for the plurality of network devices based upon the responses, the established connections, and the correlation processing, store mapping data related to the determined physical network map and virtual network topology map in said memory, display an image on said display related to the stored mapping data, the image comprising
- a combined map image based upon both the physical network map and the virtual network topology map, and
- virtual network elements from the virtual network topology map overlaid with associated physical network elements from the physical network map, and detect at least one network event in the network, and determine potential changes to the mapping data resulting from the at least one network event.

15. The network management system of claim 14 wherein said processor is configured to:
determine for each network device a device type from a plurality of different device types based upon the responses; and
establish the connections with the group of the plurality of network devices based upon determined device types.

16. The network management system of claim 14 wherein said processor is configured to determine whether the potential changes exceed a threshold level, and if so, generate an alert message.

17. A method of operating a network management system for a network comprising a plurality of network devices, the method using a memory and processor coupled therewith and comprising:
sending queries to the plurality of network devices;
obtaining responses from the plurality of network devices based upon the queries;
determining a physical network map for the plurality of network devices based upon the responses;
establishing connections with a group of the plurality of network devices;
sampling communications data, via the established connections, from the group of the plurality of network devices;
performing correlation processing on the sampled communications data and based upon a network routing protocol to determine the virtual network topology map;
determining a virtual network topology map for the plurality of network devices based upon the responses, the established connections, and the correlation processing;
storing mapping data related to the determined physical network map and virtual network topology map in the memory; and
displaying an image on a display related to the stored mapping data, the image comprising virtual network elements from the virtual network topology map overlaid with associated physical network elements from the physical network map.

18. The method of claim 17 further comprising:
determining for each network device a device type from a plurality of different device types based upon the responses; and
establishing the connections with the group of the plurality of network devices based upon determined device types.

19. The method of claim 17 further comprising determining the virtual network topology map for the plurality of network devices by determining, for each respective network device, at least one virtual routing instance and an associated port, and at least one neighboring device and associated routes.

20. A non-transitory computer readable medium storing executable instructions that, when executed, cause a processor to perform steps for operating a network management system for a network comprising a plurality of network devices, the steps comprising:
sending queries to the plurality of network devices;
obtaining responses from the plurality of network devices based upon the queries;
determining a physical network map for the plurality of network devices based upon the responses;
establishing connections with a group of the plurality of network devices;
sampling communications data, via the established connections, from the group of the plurality of network devices;
performing correlation processing on the sampled communications data and based upon a network routing protocol to determine the virtual network topology map;
determining a virtual network topology map for the plurality of network devices based upon the responses, the established connections, and the correlation processing;
storing mapping data related to the determined physical network map and virtual network topology map in the memory; and
displaying an image on a display related to the stored mapping data, the image comprising virtual network elements from the virtual network topology map overlaid with associated physical network elements from the physical network map.

21. The non-transitory computer readable medium of claim 20 wherein the steps further comprise:
determining for each network device a device type from a plurality of different device types based upon the responses; and
establishing the connections with the group of the plurality of network devices based upon determined device types.

22. The non-transitory computer readable medium of claim 20 wherein the steps further comprise determining the virtual network topology map for the plurality of network devices by at least determining, for each respective network device, at least one virtual routing instance and an associated port, and at least one neighboring device and associated routes.

23. The network management system of claim 20 wherein said processor is configured to process a plurality of potential physical and logical views representing features of each network device; and wherein the features include logical connectivity, internal physical structure, and logical structures.

* * * * *